(12) United States Patent
Assouline et al.

(10) Patent No.: US 12,243,173 B2
(45) Date of Patent: *Mar. 4, 2025

(54) SIDE-BY-SIDE CHARACTER ANIMATION FROM REALTIME 3D BODY MOTION CAPTURE

(71) Applicant: Snap Inc., Santa Monica, CA (US)

(72) Inventors: Avihay Assouline, Tel Aviv (IL); Itamar Berger, Hod Hasharon (IL); Gal Dudovitch, Tel Aviv (IL); Matan Zohar, Rishon LeZion (IL)

(73) Assignee: SNAP INC., Santa Monica, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 18/100,080

(22) Filed: Jan. 23, 2023

(65) Prior Publication Data
US 2023/0154121 A1    May 18, 2023

Related U.S. Application Data

(63) Continuation of application No. 17/081,178, filed on Oct. 27, 2020, now Pat. No. 11,615,592.

(51) Int. Cl.
G06T 19/00 (2011.01)
G06T 7/20 (2017.01)
(Continued)

(52) U.S. Cl.
CPC .............. *G06T 19/006* (2013.01); *G06T 7/20* (2013.01); *G06T 7/62* (2017.01); *G06T 7/70* (2017.01);
(Continued)

(58) Field of Classification Search
None
See application file for complete search history.

(56) References Cited

U.S. PATENT DOCUMENTS 5,880,731 A    3/1999 Liles et al.
6,020,891 A    2/2000 Rekimoto
(Continued)

FOREIGN PATENT DOCUMENTS

CA    2887596 A1    7/2015
CN    109863532 A    6/2019
(Continued)

OTHER PUBLICATIONS

U.S. Appl. No. 16/269,312 U.S. Pat. No. 10,984,575, filed Feb. 6, 2019, Body Pose Estimation.
(Continued)

*Primary Examiner* — Steven Z Elbinger
(74) *Attorney, Agent, or Firm* — SCHWEGMAN LUNDBERG & WOESSNER, P.A.

(57) ABSTRACT

Aspects of the present disclosure involve a system comprising a computer-readable storage medium storing at least one program, and a method for performing operations comprising: receiving a video that depicts a person; tracking three-dimensional (3D) movement of the person within the video using a 3D reference point; computing a 3D position for placement of an augmented reality item relative to the 3D reference point; causing to be displayed the augmented reality item within the video at the 3D position; and updating the 3D position of the augmented reality item in the video as the 3D reference point changes based on the 3D movement of the person.

20 Claims, 13 Drawing Sheets

(51) Int. Cl.
*G06T 7/62* (2017.01)
*G06T 7/70* (2017.01)
*G06T 19/20* (2011.01)

(52) U.S. Cl.
CPC .......... *G06T 19/20* (2013.01); *G06T 2200/24* (2013.01); *G06T 2207/10016* (2013.01); *G06T 2207/30196* (2013.01); *G06T 2219/2016* (2013.01)

(56) References Cited

U.S. PATENT DOCUMENTS

| | | |
|---|---|---|
| 6,023,270 A | 2/2000 | Brush, II et al. |
| 6,038,295 A | 3/2000 | Mattes |
| 6,223,165 B1 | 4/2001 | Lauffer |
| 6,285,381 B1 | 9/2001 | Sawano et al. |
| 6,753,863 B1 | 6/2004 | Winkler et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,173,651 B1 | 2/2007 | Knowles |
| 7,342,587 B2 | 3/2008 | Danzig et al. |
| 7,411,493 B2 | 8/2008 | Smith |
| 7,468,729 B1 | 12/2008 | Levinson |
| 7,535,890 B2 | 5/2009 | Rojas |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,199,747 B2 | 6/2012 | Rojas et al. |
| 8,253,746 B2 | 8/2012 | Geisner et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Del |
| 8,601,051 B2 | 12/2013 | Wang |
| 8,601,379 B2 | 12/2013 | Marks et al. |
| 8,632,408 B2 | 1/2014 | Gillo et al. |
| 8,633,913 B1 | 1/2014 | Raghu et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,730,156 B2 | 5/2014 | Weising et al. |
| 8,749,557 B2 | 6/2014 | Evertt et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,952,969 B2 | 2/2015 | Isner |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,196,094 B2 | 11/2015 | Ur |
| 9,204,252 B2 | 12/2015 | Root |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,517,403 B1 | 12/2016 | Kim et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,633,447 B2 | 4/2017 | Swaminathan et al. |
| 9,645,394 B2 | 5/2017 | Kinnebrew et al. |
| 9,648,376 B2 | 5/2017 | Chang et al. |
| 9,652,897 B2 | 5/2017 | Osborn et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,134,296 B2 | 11/2018 | Anderson et al. |
| 10,155,168 B2 | 12/2018 | Blackstock et al. |
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,325,416 B1 | 6/2019 | Scapel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,740,978 B2 | 8/2020 | McPhee et al. |
| 10,984,575 B2 | 4/2021 | Assouline et al. |
| 11,210,834 B1 | 12/2021 | Chamdani et al. |
| 11,450,051 B2 | 9/2022 | Assouline et al. |
| 11,880,947 B2 | 1/2024 | Assouline et al. |
| 2002/0067362 A1 | 6/2002 | Agostino Nocera et al. |
| 2002/0135581 A1 | 9/2002 | Russell et al. |

(56) References Cited

U.S. PATENT DOCUMENTS

| | | |
|---|---|---|
| 2002/0169644 A1 | 11/2002 | Greene |
| 2004/0212630 A1 | 10/2004 | Hobgood et al. |
| 2005/0041842 A1 | 2/2005 | Frakes et al. |
| 2005/0071306 A1 | 3/2005 | Kruszewski et al. |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0230747 A1 | 10/2007 | Dunko |
| 2007/0279419 A1 | 12/2007 | Seebach |
| 2008/0078758 A1 | 4/2008 | Shimura et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0144638 A1 | 6/2009 | Haggar et al. |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2010/0281432 A1 | 11/2010 | Geisner et al. |
| 2010/0302138 A1 | 12/2010 | Poot et al. |
| 2010/0302253 A1 | 12/2010 | Kipman et al. |
| 2011/0007079 A1 | 1/2011 | Perez et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0216060 A1 | 9/2011 | Weising et al. |
| 2011/0239136 A1 | 9/2011 | Goldman et al. |
| 2012/0038628 A1 | 2/2012 | Corazza et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0147014 A1 | 6/2012 | Lee |
| 2012/0188257 A1 | 7/2012 | Girard |
| 2012/0194549 A1 | 8/2012 | Osterhout et al. |
| 2012/0209924 A1 | 8/2012 | Evans et al. |
| 2012/0214594 A1 | 8/2012 | Kirovski et al. |
| 2013/0021373 A1 | 1/2013 | Vaught et al. |
| 2013/0050258 A1 | 2/2013 | Liu et al. |
| 2013/0091206 A1 | 4/2013 | Moraes et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0278631 A1 | 10/2013 | Border et al. |
| 2013/0290876 A1 | 10/2013 | Anderson et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0253431 A1 | 9/2014 | Gossweiler, III et al. |
| 2014/0282223 A1 | 9/2014 | Bastien et al. |
| 2014/0321702 A1 | 10/2014 | Schmalstieg |
| 2014/0331149 A1 | 11/2014 | Labey |
| 2014/0351758 A1 | 11/2014 | Yoshida |
| 2015/0042663 A1 | 2/2015 | Mandel et al. |
| 2015/0098614 A1 | 4/2015 | Gee et al. |
| 2015/0154782 A1 | 6/2015 | Geisner et al. |
| 2015/0158178 A1 | 6/2015 | Burmeister et al. |
| 2015/0206349 A1 | 7/2015 | Rosenthal et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0286829 A1 | 10/2015 | Amacker et al. |
| 2015/0309563 A1 | 10/2015 | Connor |
| 2015/0371447 A1 | 12/2015 | Yasutake |
| 2016/0025978 A1 | 1/2016 | Mallinson |
| 2016/0063600 A1 | 3/2016 | Wuang |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0202755 A1 | 7/2016 | Connor |
| 2016/0210780 A1 | 7/2016 | Paulovich et al. |
| 2016/0234149 A1 | 8/2016 | Tsuda et al. |
| 2016/0247309 A1 | 8/2016 | Li et al. |
| 2016/0267699 A1 | 9/2016 | Borke et al. |
| 2016/0330522 A1 | 11/2016 | Newell et al. |
| 2016/0360115 A1 | 12/2016 | Rim |
| 2017/0038829 A1 | 2/2017 | Lanier et al. |
| 2017/0039986 A1 | 2/2017 | Lanier et al. |
| 2017/0069134 A1 | 3/2017 | Shapira et al. |
| 2017/0080346 A1 | 3/2017 | Abbas |
| 2017/0084070 A1 | 3/2017 | Chamdani et al. |
| 2017/0087473 A1 | 3/2017 | Siegel et al. |
| 2017/0090747 A1 | 3/2017 | Dash |
| 2017/0113140 A1 | 4/2017 | Blackstock et al. |
| 2017/0118145 A1 | 4/2017 | Aittoniemi et al. |
| 2017/0131781 A1 | 5/2017 | Buban |
| 2017/0178272 A1 | 6/2017 | Lashkari et al. |
| 2017/0199855 A1 | 7/2017 | Fishbeck |
| 2017/0206695 A1 | 7/2017 | Kim et al. |
| 2017/0221272 A1 | 8/2017 | Li et al. |
| 2017/0229153 A1 | 8/2017 | Moore et al. |
| 2017/0235848 A1 | 8/2017 | Van et al. |
| 2017/0255450 A1 | 9/2017 | Mullins et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0040166 A1 | 2/2018 | Jayaraj et al. |
| 2018/0047200 A1 | 2/2018 | O'Hara et al. |
| 2018/0061072 A1 | 3/2018 | Benezra et al. |
| 2018/0082430 A1 | 3/2018 | Sharma et al. |
| 2018/0095542 A1 | 4/2018 | Mallinson |
| 2018/0108179 A1 | 4/2018 | Tomlin et al. |
| 2018/0113587 A1 | 4/2018 | Allen et al. |
| 2018/0114365 A1 | 4/2018 | Egri et al. |
| 2018/0115503 A1 | 4/2018 | Baldwin et al. |
| 2018/0143950 A1 | 5/2018 | Al-Arnaouti et al. |
| 2018/0197343 A1 | 7/2018 | Hare et al. |
| 2018/0210628 A1 | 7/2018 | Mcphee et al. |
| 2018/0253897 A1 | 9/2018 | Satake |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0322680 A1 | 11/2018 | Mcelmurray et al. |
| 2018/0335930 A1 | 11/2018 | Scapel et al. |
| 2018/0349451 A1 | 12/2018 | O'Connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0038187 A1 | 2/2019 | Latella, Jr. |
| 2019/0057616 A1 | 2/2019 | Cohen et al. |
| 2019/0102681 A1 | 4/2019 | Roberts et al. |
| 2019/0107991 A1 | 4/2019 | Spivack et al. |
| 2019/0188920 A1 | 6/2019 | Mcphee et al. |
| 2019/0196663 A1 | 6/2019 | Monastyrshyn et al. |
| 2019/0255419 A1 | 8/2019 | Reilly et al. |
| 2019/0304189 A1 | 10/2019 | Falstrup et al. |

(56) References Cited

U.S. PATENT DOCUMENTS

| | | |
|---|---|---|
| 2019/0369836 A1 | 12/2019 | Faulkner et al. |
| 2019/0371080 A1 | 12/2019 | Sminchisescu et al. |
| 2019/0385374 A1 | 12/2019 | Kamhi et al. |
| 2019/0385378 A1 | 12/2019 | Bastian et al. |
| 2020/0005544 A1 | 1/2020 | Kim |
| 2020/0066014 A1 | 2/2020 | Mehta et al. |
| 2020/0066022 A1 | 2/2020 | Leong et al. |
| 2020/0074738 A1 | 3/2020 | Hare et al. |
| 2020/0105006 A1 | 4/2020 | Karsch et al. |
| 2020/0105041 A1 | 4/2020 | Garofalo et al. |
| 2020/0118343 A1 | 4/2020 | Koblin et al. |
| 2020/0134898 A1 | 4/2020 | Sheth et al. |
| 2020/0197744 A1 | 6/2020 | Schweighofer |
| 2020/0202632 A1 | 6/2020 | Goodrich et al. |
| 2020/0241299 A1 | 7/2020 | Nuber et al. |
| 2020/0241729 A1 | 7/2020 | Schneider et al. |
| 2020/0242833 A1 | 7/2020 | Kuo |
| 2020/0250874 A1 | 8/2020 | Assouline et al. |
| 2020/0265234 A1 | 8/2020 | Lee et al. |
| 2020/0327734 A1 | 10/2020 | Goodrich et al. |
| 2020/0341580 A1 | 10/2020 | Rosenbaum et al. |
| 2021/0150806 A1 | 5/2021 | Guler et al. |
| 2021/0166459 A1 | 6/2021 | Miller, IV |
| 2021/0201002 A1 | 7/2021 | Watanabe et al. |
| 2021/0209825 A1 | 7/2021 | Assouline et al. |
| 2021/0281802 A1 | 9/2021 | Kirisken |
| 2021/0298868 A1 | 9/2021 | Rydberg |
| 2021/0383607 A1 | 12/2021 | Meng et al. |
| 2022/0028178 A1 | 1/2022 | Price et al. |
| 2022/0076471 A1 | 3/2022 | Choi |
| 2022/0125337 A1 | 4/2022 | Assouline et al. |
| 2022/0130115 A1 | 4/2022 | Assouline et al. |
| 2022/0148266 A1 | 5/2022 | Kim |
| 2022/0156999 A1 | 5/2022 | Assouline et al. |
| 2022/0157000 A1 | 5/2022 | Assouline et al. |
| 2022/0157025 A1 | 5/2022 | Assouline et al. |
| 2022/0207770 A1 | 6/2022 | Liu et al. |
| 2022/0358704 A1 | 11/2022 | Kondoh et al. |
| 2022/0383577 A1 | 12/2022 | Assouline et al. |
| 2023/0090086 A1 | 3/2023 | Assouline et al. |
| 2023/0154088 A1 | 5/2023 | Duarte et al. |
| 2023/0196602 A1 | 6/2023 | Assouline et al. |
| 2023/0196685 A1 | 6/2023 | Assouline et al. |
| 2023/0196712 A1 | 6/2023 | Assouline et al. |
| 2023/0343047 A1 | 10/2023 | Assouline et al. |
| 2023/0360301 A1 | 11/2023 | Assouline et al. |
| 2024/0096040 A1 | 3/2024 | Assouline et al. |

FOREIGN PATENT DOCUMENTS

| | | |
|---|---|---|
| CN | 110168478 A | 8/2019 |
| CN | 118414636 A | 7/2024 |
| CN | 118435243 A | 8/2024 |
| CN | 118613834 A | 9/2024 |
| DE | 102018207518 A1 | 11/2019 |
| EP | 2184092 A2 | 5/2010 |
| JP | 2001230801 A | 8/2001 |
| JP | 5497931 B2 | 3/2014 |
| KR | 101445263 B1 | 9/2014 |
| KR | 20150126938 A | 11/2015 |
| KR | 20170032146 A | 3/2017 |
| KR | 20180090746 A | 8/2018 |
| KR | 102719270 | 10/2024 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 | 7/2018 |
| WO | WO-2018129531 A1 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020163592 A1 | 8/2020 |
| WO | WO-2021197143 A1 | 10/2021 |
| WO | WO-2022093939 A1 | 5/2022 |
| WO | WO-2022093958 A1 | 5/2022 |
| WO | WO-2022108805 A1 | 5/2022 |
| WO | WO-2022108806 A1 | 5/2022 |
| WO | WO-2022108807 A1 | 5/2022 |
| WO | WO-2023121896 A1 | 6/2023 |
| WO | WO-2023121897 A1 | 6/2023 |
| WO | WO-2023121898 A1 | 6/2023 |

OTHER PUBLICATIONS

U.S. Appl. No. 17/212,555 U.S. Pat. No. 11,557,075, filed Mar. 25, 2021, Body Pose Estimations.

U.S. Appl. No. 18/060,449, filed Nov. 30, 2022, Body pose Estimations.

U.S. Appl. No. 16/951,884 U.S. Pat. No. 11,450,051, filed Nov. 18, 2020, Personalized Avatar Real-Time Motion Capture.

U.S. Appl. No. 17/818,539, filed Aug. 9, 2022, Personalized Avatar Real-Time Motion Capture.

U.S. Appl. No. 16/951,921, filed Nov. 18, 2020, Body Animation Sharing and Remixing.

U.S. Appl. No. 17/081,178, filed Oct. 27, 2020, Side-by-Side Character Animation from Realtime 3D Body Motion Capture.

U.S. Appl. No. 16/951,939, filed Nov. 18, 2020, Real-Time Motion Transfer for Prosthetic Limbs.

U.S. Appl. No. 17/645,366, filed Dec. 21, 2021, Real-Time Motion and Apperance Transfer.

U.S. Appl. No. 16/949,607, filed Nov. 6, 2020, Adaptive Skeletal Joint Smoothing.

U.S. Appl. No. 17/557,652, filed Dec. 21, 2021, Real-Time Garment Exchange.

U.S. Appl. No. 17/557,277, filed Dec. 21, 2021, Real-Time Upper-Body Garmant Exchange.

"U.S. Appl. No. 16/269,312, Examiner Interview Summary mailed Jun. 24, 2020", 3 pgs.

"U.S. Appl. No. 16/269,312, Non Final Office Action mailed Apr. 14, 2020", 18 pgs.

"U.S. Appl. No. 16/269,312, Notice of Allowance mailed Aug. 19, 2020", 9 pgs.

"U.S. Appl. No. 16/269,312, Notice of Allowance mailed Dec. 30, 2020", 9 pgs.

"U.S. Appl. No. 16/269,312, Response filed Jun. 23, 2020 to Non Final Office Action mailed Apr. 14, 2020", 10 pgs.

"U.S. Appl. No. 16/951,884, Corrected Notice of Allowability mailed Jun. 22, 2022", 2 pgs.

"U.S. Appl. No. 16/951,884, Final Office Action mailed Jan. 7, 2022", 15 pgs.

"U.S. Appl. No. 16/951,884, Non Final Office Action mailed Sep. 9, 2021", 14 pgs.

"U.S. Appl. No. 16/951,884, Notice of Allowance mailed Mar. 9, 2022", 5 pgs.

"U.S. Appl. No. 16/951,884, Notice of Allowance mailed Jun. 8, 2022", 5 pgs.

"U.S. Appl. No. 16/951,884, Response filed Feb. 16, 2022 to Final Office Action mailed Jan. 7, 2022", 10 pgs.

"U.S. Appl. No. 16/951,884, Response filed Dec. 1, 2021 to Non Final Office Action mailed Sep. 9, 2021", 11 pgs.

"U.S. Appl. No. 16/951,921, Non Final Office Action mailed Oct. 7, 2022", 27 pgs.

"U.S. Appl. No. 16/951,939, Non Final Office Action mailed Aug. 18, 22", 16 pgs.

"U.S. Appl. No. 16/951,939, Response filed Nov. 17, 2022 to Non Final Office Action mailed Aug. 18, 2022", 9 pgs.

"U.S. Appl. No. 17/081,178, Non Final Office Action mailed Mar. 9, 2022", 31 pgs.

(56) References Cited

OTHER PUBLICATIONS

"U.S. Appl. No. 17/081,178, Notice of Allowance mailed Aug. 17, 2022", 9 pgs.

"U.S. Appl. No. 17/081,178, Notice of Allowance mailed Dec. 5, 2022", 9 pgs.

"U.S. Appl. No. 17/081,178, Response filed Jun. 3, 2022 to Non Final Office Action mailed Mar. 9, 2022", 10 pgs.

"U.S. Appl. No. 17/081,178, Supplemental Notice of Allowability mailed Aug. 31, 2022", 2 pgs.

"U.S. Appl. No. 17/212,555, Corrected Notice of Allowability mailed Sep. 22, 2022", 2 pgs.

"U.S. Appl. No. 17/212,555, Final Office Action mailed Mar. 2, 2022", 25 pgs.

"U.S. Appl. No. 17/212,555, Non Final Office Action mailed Oct. 4, 2021", 20 pgs.

"U.S. Appl. No. 17/212,555, Notice of Allowance mailed May 17, 2022", 8 pgs.

"U.S. Appl. No. 17/212,555, Notice of Allowance mailed Sep. 1, 2022", 8 pgs.

"U.S. Appl. No. 17/212,555, Response filed Jan. 3, 2022 to Non Final Office Action mailed Oct. 4, 2021", 10 pgs.

"U.S. Appl. No. 17/212,555, Response filed Apr. 29, 2022 to Final Office Action mailed Mar. 2, 2022", 9 pgs.

"International Application Serial No. PCT/US2020/017006, International Search Report mailed Jul. 30, 2020", 6 pgs.

"International Application Serial No. PCT/US2020/017006, Invitation to Pay Additional Fees mailed Jun. 2, 2020", 13 pgs.

"International Application Serial No. PCT/US2020/017006, Written Opinion mailed Jul. 30, 2020", 12 pgs.

"International Application Serial No. PCT/US2021/056820, International Search Report mailed Feb. 28, 2022", 4 pgs.

"International Application Serial No. PCT/US2021/056820, Written Opinion mailed Feb. 28, 2022", 9 pgs.

"International Application Serial No. PCT/US2021/056850, International Search Report mailed Feb. 9, 2022", 5 pgs.

"International Application Serial No. PCT/US2021/056850, Written Opinion mailed Feb. 9, 2022", 9 pgs.

"International Application Serial No. PCT/US2021/058800, International Search Report mailed Feb. 18, 2022", 4 pgs.

"International Application Serial No. PCT/US2021/058800, Written Opinion mailed Feb. 18, 2022", 6 pgs.

"International Application Serial No. PCT/US2021/058811, International Search Report mailed Feb. 24, 2022", 5 pgs.

"International Application Serial No. PCT/US2021/058811, Written Opinion mailed Feb. 24, 2022", 11 pgs.

"International Application Serial No. PCT/US2021/058816, International Search Report mailed Mar. 3, 2022", 5 pgs.

"International Application Serial No. PCT/US2021/058816, Written Opinion mailed Mar. 3, 2022", 15 pgs.

"Skeletal animation", Wikipedia, [Online] Retrieved from the Internet: <URL: https://en.wikipedia.org/w/index.php?title=Skeletal_animation&oldid=694599494>, (Dec. 10, 2015), 3 pgs.

Cimen, Gokcen, et al., "Animation Models for Interactive AR Characters", Doctoral dissertation, Retrieved from the Internet: <URL:https://www.research-collection.ethz.ch/bitstream/handle/20.500.11850/372660/5/AnimationModelsforInteractiveARCharacters.pdf>, [retrieved on Feb. 15, 2022], (Jan. 1, 2019), 1-113.

Cimen, Gokcen, et al., "AR Poser: Automatically Augmenting Mobile Pictures with Digital Avatars Imitating Poses", 12th International Conference on Computer Graphics, Visualization, Computer Vision and Image Processing, (Jul. 18, 2018), 5 pgs.

Fieraru, Mihai, et al., "Learning to Refine Human Pose Estimation", IEEE/CVF Conference on Computer Vision and Pattern Recognition Workshops (CVPRW), (2018), 318-327.

Giaccone, P R, et al., "Foreground-background segmentation by cellular neural networks", IEEE 15th International Conference on Pattern Recognition (ICPR-2000), vol. 2, (2000), 438-441.

Kawai, Norihiko, et al., "Diminished Reality Based on Image Inpainting Considering Background Geometry", IEEE transactions on visualization and computer graphics, 22(3), (Mar. 1, 2016), 1236-1247.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Lipeng, Ke, et al., "Multi-Scale Structure-Aware Network for Human Pose Estimation", Springer Nature Switzerland AG, ECCV 2018, LNCS 11206, (2018), 731-746.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Mehta, Dushyant, et al., "VNect: Real-time 3D Human Pose Estimation with a Single RGB Camera", arxiv.org, Cornell University Library, [Online] Retrieved from the internet: <https://vcai.mpi-inf.mpg.de/projects/VNect/>, (May 3, 2017), 14 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Park, Jong-Seung, et al., "Virtual Object Placement in Video for Augmented Reality", Advances in Multimedia Information Processing-PCM 2005: 6th Pacific Rim Conference on Multimedia, Jeju Island, KR, Proceedings (vol. 3767). Springer, Berlin, DE, (2005), 13-24.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar Slam", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Jan. 1, 2014), 8 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

Vogele, Anna, et al., "Interactive steering of mesh animations", Computer Animation, Eurographics Association, P. O. Box 16 Aire-La-Ville CH-1288 Switzerland, (Jul. 29, 2012), 53-58.

Yamane, Katsu, et al., "Animating non-humanoid characters with human motion data", Computer Animation, Eurographics Association, P. O. Box 16 Aire-La-Ville CH-1288 Switzerland, (Jul. 2, 2010), 169-178.

Yong, Du, et al., "Hierarchical Recurrent Neural Network for Skeleton Based Action Recognition", IEEE Conference On Computer Vision and Pattern Recognition (CVPR), (Jun. 2015), 1110-1118.

"U.S. Appl. No. 16/949,607, Notice of Allowance mailed Jan. 31, 2023", 10 pgs.

"U.S. Appl. No. 16/951,921, Advisory Action mailed Mar. 14, 2023", 3 pgs.

"U.S. Appl. No. 16/951,921, Corrected Notice of Allowability mailed Apr. 20, 2023", 4 pgs.

"U.S. Appl. No. 16/951,921, Final Office Action mailed Feb. 3, 2023", 30 pgs.

"U.S. Appl. No. 16/951,921, Notice of Allowance mailed Apr. 18, 2023", 9 pgs.

"U.S. Appl. No. 16/951,921, Response filed Jan. 6, 2023 to Non Final Office Action mailed Oct. 7, 2022", 10 pgs.

"U.S. Appl. No. 16/951,921, Response filed Mar. 2, 2023 to Final Office Action mailed Feb. 3, 2023", 10 pgs.

"U.S. Appl. No. 16/951,939, Final Office Action mailed Feb. 16, 2023", 19 pgs.

"U.S. Appl. No. 16/951,939, Notice of Allowance mailed Apr. 5, 2023", 8 pgs.

"U.S. Appl. No. 16/951,939, Response filed Mar. 9, 2023 to Final Office Action mailed Feb. 16, 2023", 9 pgs.

(56) References Cited

OTHER PUBLICATIONS

"U.S. Appl. No. 17/081,178, Supplemental Notice of Allowability mailed Feb. 7, 2023", 2 pgs.
"U.S. Appl. No. 17/557,277, Final Office Action Mailed Jun. 27, 2023", 20 pgs.
"U.S. Appl. No. 17/557,277, Non Final Office Action mailed Mar. 3, 2023", 28 pgs.
"U.S. Appl. No. 17/557,277, Notice of Allowance mailed Sep. 1, 2023", 11 pgs.
"U.S. Appl. No. 17/557,277, Response filed Jun. 5, 2023 to Non Final Office Action mailed Mar. 3, 2023", 11 pgs.
"U.S. Appl. No. 17/557,277, Response filed Aug. 11, 2023 to Final Office Action Mailed Jun. 27, 2023", 11 pgs.
"U.S. Appl. No. 17/557,652, Examiner Interview Summary mailed Jul. 2, 2024", 2 pgs.
"U.S. Appl. No. 17/557,652, Non Final Office Action mailed Apr. 12, 2024", 43 pgs.
"U.S. Appl. No. 17/557,652, Notice of Allowance mailed Aug. 21, 2024", 11 pgs.
"U.S. Appl. No. 17/557,652, Response filed Jul. 10, 2024 to Non Final Office Action mailed Apr. 12, 2024", 11 pgs.
"U.S. Appl. No. 17/645,366, Non Final Office Action mailed Mar. 7, 2024", 24 pgs.
"U.S. Appl. No. 17/645,366, Notice of Allowance mailed Sep. 5, 2024", 10 pgs.
"U.S. Appl. No. 17/645,366, Response filed May 28, 2024 to Non Final Office Action mailed Mar. 7, 2024", 10 pgs.
"U.S. Appl. No. 17/645,366, Supplemental Notice of Allowability mailed Sep. 16, 2024", 2 pgs.
"U.S. Appl. No. 17/818,539, Non Final Office Action mailed Mar. 14, 2024", 22 pgs.
"U.S. Appl. No. 18/060,449, Non Final Office Action mailed Feb. 27, 2024", 6 pgs.
"U.S. Appl. No. 18/060,449, Non Final Office Action mailed Nov. 8, 2023", 5 pgs.
"U.S. Appl. No. 18/060,449, Response filed Jan. 2, 2024 to Non Final Office Action mailed Nov. 8, 2023", 4 pgs.
"U.S. Appl. No. 18/060,449, Response filed May 7, 2024 to Non Final Office Action mailed Feb. 27, 2024", 7 pgs.
"U.S. Appl. No. 18/216,958, Notice of Allowability mailed May 6, 2024", 2 pgs.
"U.S. Appl. No. 18/222,799, Final Office Action mailed Jun. 21, 2024", 40 pgs.
"U.S. Appl. No. 18/222,799, Non Final Office Action mailed Mar. 1, 2024", 44 pgs.
"U.S. Appl. No. 18/222,799, Notice of Allowance mailed Oct. 16, 2024", 12 pgs.
"U.S. Appl. No. 18/222,799, Response filed May 29, 2024 to Non Final Office Action mailed Mar. 1, 2024", 10 pgs.
"International Application Serial No. PCT/US2020/017006, International Preliminary Report on Patentability mailed Aug. 19, 2021", 14 pgs.
"International Application Serial No. PCT/US2021/056820, International Preliminary Report on Patentability mailed May 11, 2023", 11 pgs.
"International Application Serial No. PCT/US2021/056850, International Preliminary Report on Patentability mailed May 11, 2023", 11 pgs.
"International Application Serial No. PCT/US2021/058800, International Preliminary Report on Patentability mailed Jun. 1, 2023", 8 pgs.
"International Application Serial No. PCT/US2021/058811, International Preliminary Report on Patentability mailed Jun. 1, 2023", 13 pgs.
"International Application Serial No. PCT/US2021/058816, International Preliminary Report on Patentability mailed Jun. 1, 2023". 17 pgs.
"International Application Serial No. PCT/US2022/052520, International Preliminary Report on Patentability mailed Jul. 4, 2024", 7 pgs.
"International Application Serial No. PCT/US2022/052520, International Search Report mailed Apr. 13, 2023", 4 pgs.
"International Application Serial No. PCT/US2022/052520, Written Opinion mailed Apr. 13, 2023", 5 pgs.
"International Application Serial No. PCT/US2022/052528, International Preliminary Report on Patentability mailed Jul. 4, 2024", 15 pgs.
"International Application Serial No. PCT/US2022/052528, International Search Report mailed Mar. 28, 2023", 6 pgs.
"International Application Serial No. PCT/US2022/052528, Written Opinion mailed Mar. 28, 2023", 13 pgs.
"International Application Serial No. PCT/US2022/052532, International Preliminary Report on Patentability mailed Jul. 4, 2024", 6 pgs.
"International Application Serial No. PCT/US2022/052532, International Search Report mailed Apr. 17, 2023", 4 pgs.
"International Application Serial No. PCT/US2022/052532,23", 4 pgs.
"Korean Application Serial No. 10-2021-7028027, Notice of Preliminary Rejection mailed Dec. 15, 2022", w/ English Translation, 15 pgs.
"Korean Application Serial No. 10-2023-7017644, Notice of Preliminary Rejection mailed Apr. 26, 2024", w/ English translation, 10 pgs.
Albahar, Badour, et al., "Pose with Style: Detail-Preserving Pose-Guided Image Synthesis with Conditional StyleGAN", arxiv.org, Cornell University Library, 201 Olin Library Cornell University Ithaca, NY 14853, (Sep. 13, 2021), 11 pgs.
Guler, Riza Alp, et al., "DensePose: Dense Human Pose Estimation in the Wild", IEEE/CVF Conference On Computer Vision and Pattern Recognition, IEEE, (Jun. 18, 2018), 10 pgs.
Hauswiesner, et al., "Image-Based Clothes Transfer", 10th IEEE International Symposium on Mixed and Augmented Reality, (Oct. 2011), 169-172.
Jong, et al., "Short Video Datasets Show Potential for Outfits in Augmented Reality", 2019 International Conference on High Performance Computing and Simulation, (Jul. 2019), 201-208.
Li, et al., "PoNA: Pose-guided Non-local Attention for Human Pose Transfer", (2020), 16 pgs.
Liu, Ting, et al., "3D Clothing Transfer in Virtual Fitting Based on UV Mapping", 11th International Congress On Image and Signal Processing, Biomedical Engineering and Informatics (CISP-BMEI), IEEE, (Oct. 13, 2018), 6 pgs.
Liu, Ting, et al., "Spatial-Aware Texture Transformer for High-Fidelity Garment Transfer", IEEE Transactions On Image Processing, IEEE, USA, vol. 30, (Aug. 30, 2021), 7499-7510.
Liu, Wen, et al., "Liquid Warping GAN With Attention: A Unified Framework for Human Image Synthesis", IEEE Transactions On Pattern Analysis and Machine Intelligence, IEEE Computer Society, USA, vol. 44, No. 9, (May 7, 2021), 18 pgs.
Liu, Wen, et al., "Liquid Warping GAN: A Unified Framework for Human Motion Imitation, Appearance Transfer and Novel View Synthesis", IEEE/CVF International Conference On Computer Vision (ICCV), IEEE, (Oct. 27, 2019), 10 pgs.
Raj, Amit, et al., "SwapNet: Image Based Garment Transfer", Pattern Recognition: 5th Asian Conference, ACPR 2019, Auckland, NZ, Nov. 26-29, 2019, Revised Selected Papers, Part II; [Lecture Notes in Computer Science], Springer, Cham, (Oct. 6, 2018), 679-695.
Sarkar, Kripasindhu, et al., "Neural Re-rendering of Humans from a Single Image", 16th European Conference—Computer Vision—ECCV 2020, (Aug. 23, 2020), 18 pgs.
Yang-Tian, Sun, et al., "Human Motion Transfer with 3D Constraints and Detail Enhancement", arxiv.org, Cornell University Library, 201 Olin Library Cornell University Ithaca, NY 14853, (May 8, 2021), 12 pgs.
Yu, Li, et al., "Inpainting-Based Virtual Try-on Network for Selective Garment Transfer". IEEE Access, vol. 7, (Sep. 13, 2019), 134125-134136.
Zhu, et al., "Progressive and Aligned Pose Attention Transfer for Person Image Generation", IEEE Transactions On Pattern Analysis And Machine Intelligence, (2021), 21 pgs.

SIDE-BY-SIDE CHARACTER ANIMATION FROM REALTIME 3D BODY MOTION CAPTURE

PRIORITY CLAIM

This application is a continuation of U.S. patent application Ser. No. 17/081,178, filed on Oct. 27, 2020, which is hereby incorporated by reference in its entirety.

TECHNICAL FIELD

The present disclosure relates generally to visual presentations and more particularly to rendering virtual objects in real-world environments.

BACKGROUND

Virtual rendering systems can be used to create engaging and entertaining augmented reality experiences, in which three-dimensional virtual object graphics content appears to be present in the real-world. Such systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real-world.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
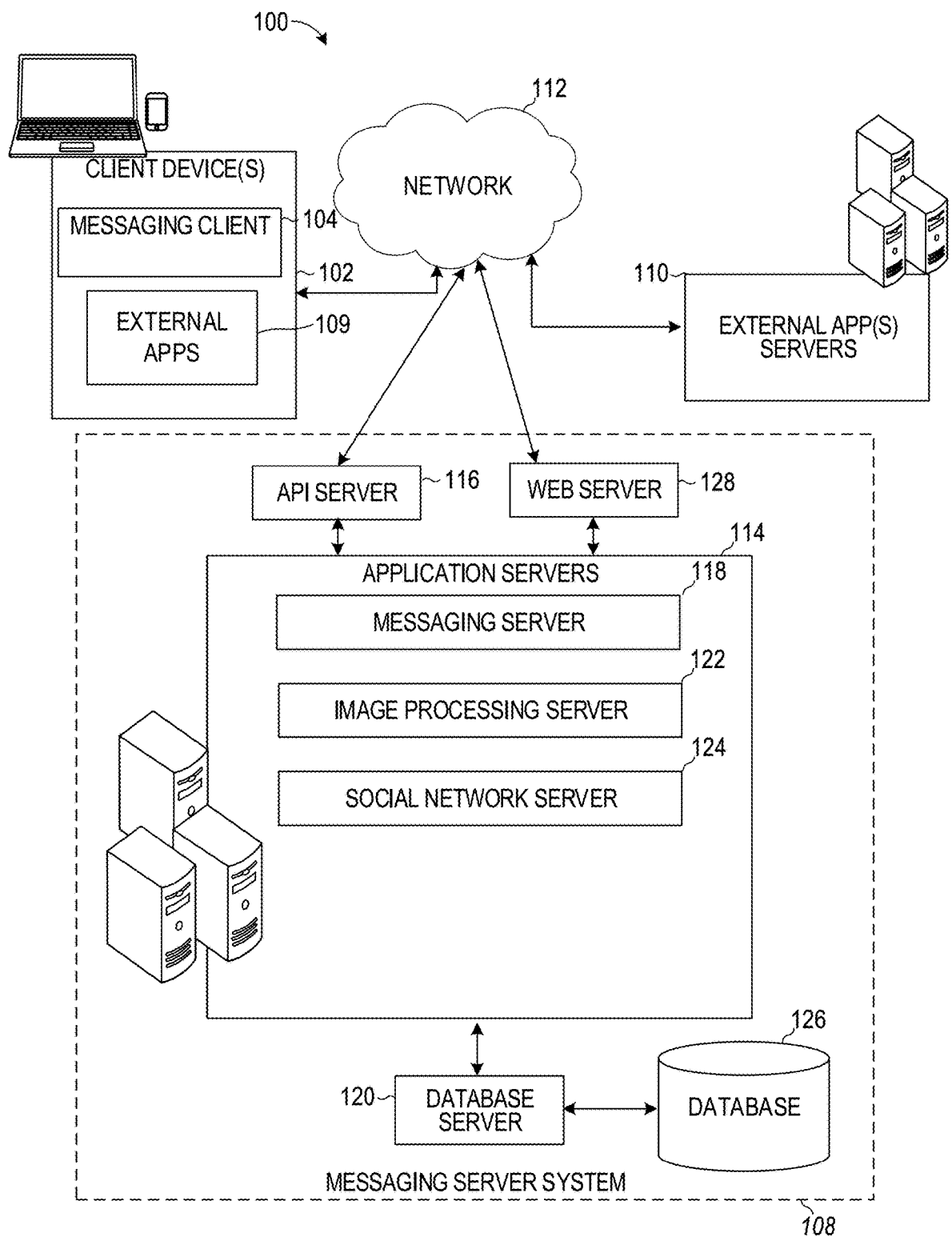
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Among other things, embodiments of the present disclosure improve the functionality of electronic messaging and imaging software and systems by rendering an augmented reality item and effects as if the augmented reality object exists in a real-world scene containing real-world objects featured in a video. Some examples of an augmented reality item include a two-dimensional virtual object or a three-dimensional (3D) virtual object, such as a 3D caption, emoji, character, avatar, animation, looping animation of a personalized avatar or character, looping or non-looping animated graphic such as a dancing hot dog, a stylized word with animation and particles effects, multiple virtual objects, and the like. In some embodiments, one such augmented reality item is selected by a user and added to a video to provide the illusion that the selected augmented reality item is part of the real-world scene. The augmented reality item can be an avatar that represents the user or person in the video.

In some embodiments, placement, positioning and movement of the selected augmented reality item is dynamically adjusted relative to placement, positioning, and movement of a person that is depicted in the video to maintain the illusion that the augmented reality item is part of the real-world scene. In order to dynamically adjust the placement, positioning and movement of the augmented reality item relative to the person in the scene, movement of the person is tracked in 3D using a three-dimensional reference point. A 3D position and placement of the augmented reality item is computed based on the 3D reference point. As the person moves around the video in 3D the reference point is updated and consequently the placement and positioning of the augmented reality item is also updated. As an example, if the person in the video moves closer to the camera, the augmented reality item also moves closer to the camera by the same degree and amount that the person has moved. In one case, the augmented reality item is placed at a position that is a threshold distance to the right or left of the person depicted in the video. As another example, if the person moves towards the right relative to the camera by a specified distance, the augmented reality item also is moved to the right by the same specified distance. Namely, the position of the augmented reality item is directly related and computed based on the 3D reference point of the person.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

Figure 2:
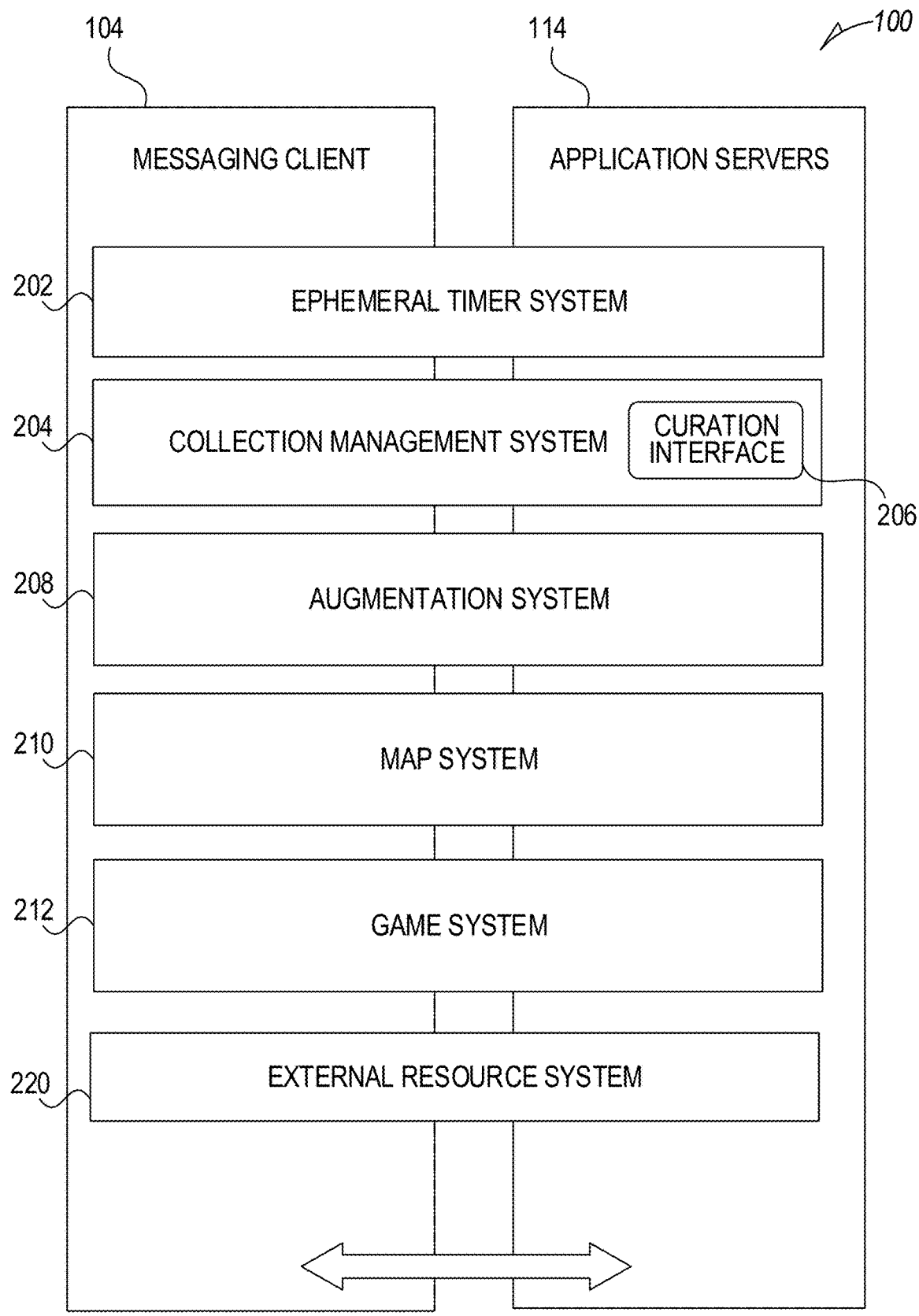
FIG. 2 is a diagrammatic representation of a messaging system, in accordance with some examples, that has both client-side and server-side functionality.

The application servers 114 also include an image processing server 122 that is dedicated to performing various image processing operations, typically with respect to images or video within the payload of a message sent from or received at the messaging server 118. Detailed functionality of the image processing server 122 is shown and described in connection with FIG. 5. Image processing server 122 is used to implement 3D body model generation operations of the 3D body model generation system 230 (FIG. 2).

In one embodiment, the image processing server 122 detects a person in a 2D image. The image processing server 122 generates a set of landmarks representing bones/joints of the person detected in the 2D image. The image processing server 122 adjusts parameters of the model generated by the 3D body model generation system 230 based on the set of landmarks to generate a skeleton and template corresponding to the person detected in the 2D image. A character animation or avatar can be selected (e.g., the user can manually select a desired avatar or one can be automatically retrieved and selected). The skeletal rig used to generate the character animation or avatar is adjusted based on the skeleton and template generated by the 3D body model generation system 230 to represent the physical attributes of the person depicted in the 2D image. As an example, the arms of the skeletal rig can be enlarged to match the arms' skeletal bones of the person depicted in the image. Specifically, if the person's arms are longer than the average person represented by the avatar rig, the arms of the avatar rig can be extended. A different user with shorter arms may cause the avatar rig to be generated with shorter arms. This way, the avatar or character generated based on the skeletal rig can more closely mirror the physical attributes of the person depicted in the 2D image. The avatar can then replace or supplement the person in the 2D image and/or video.

Figure 3:
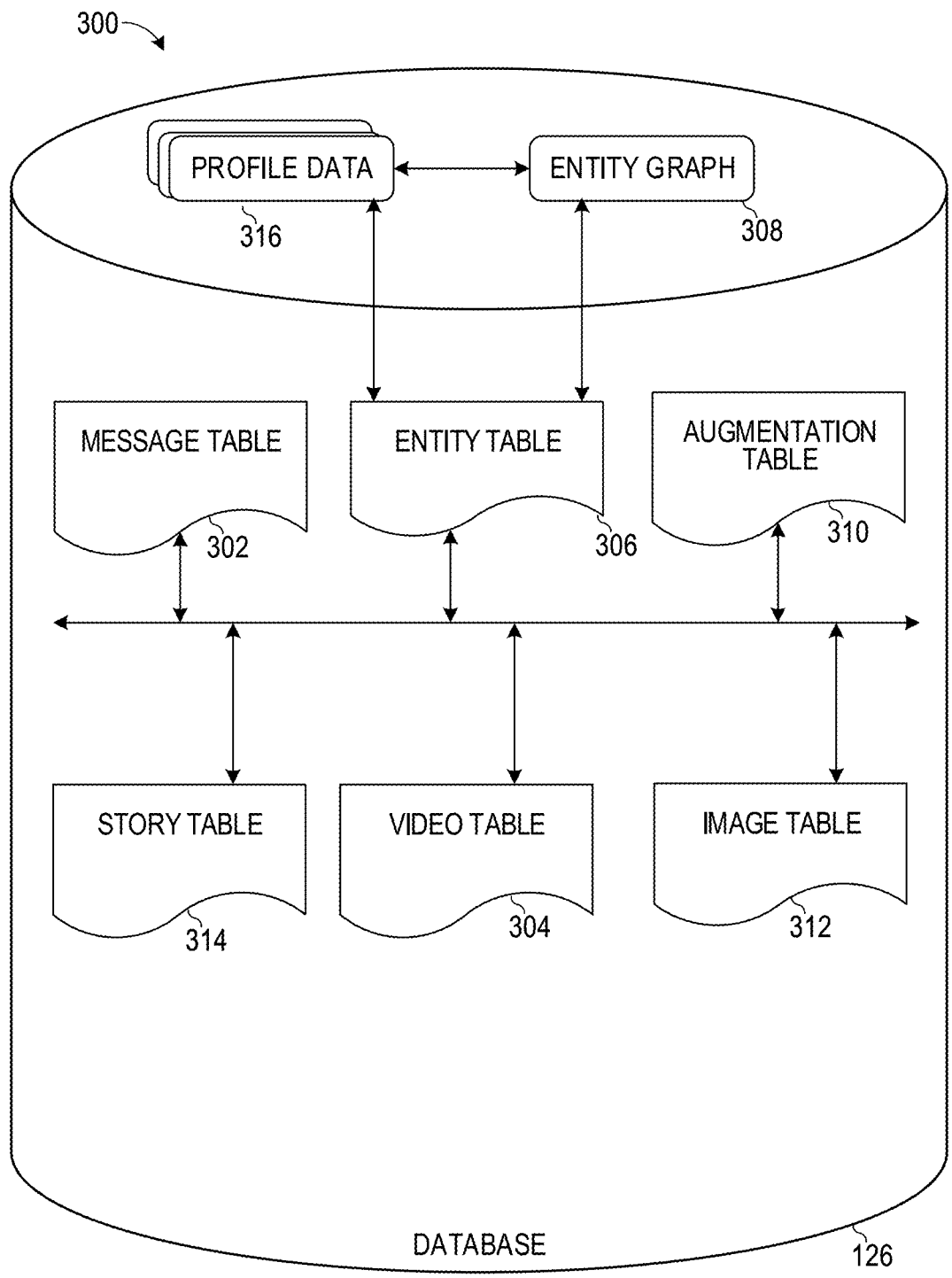
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 provides functionality to generate, display, and track virtual objects at positions relative to a real-world object (e.g., a person) depicted in a video captured by the client device 102. For example, the augmentation system 208 tracks virtual objects or augmented reality items (e.g., avatars) within at positions relative to real-world objects featured in a real-world scene of the video. The augmentation system 208 comprises a set of tracking subsystems configured to track the virtual object at the position in three-dimensional space based on a set of tracking indicia which may are stored and associated with the video, and transition between tracking subsystems. The augmentation system 208 may further transition between tracking with six degrees of freedom (6DoF) and tracking with three degrees of freedom (3DoF) based on an availability of the tracking indicia stored for the video.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5)—based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, virtual objects, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video with multiple augmented reality content items to see how the different augmented reality content items will modify the stored video. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
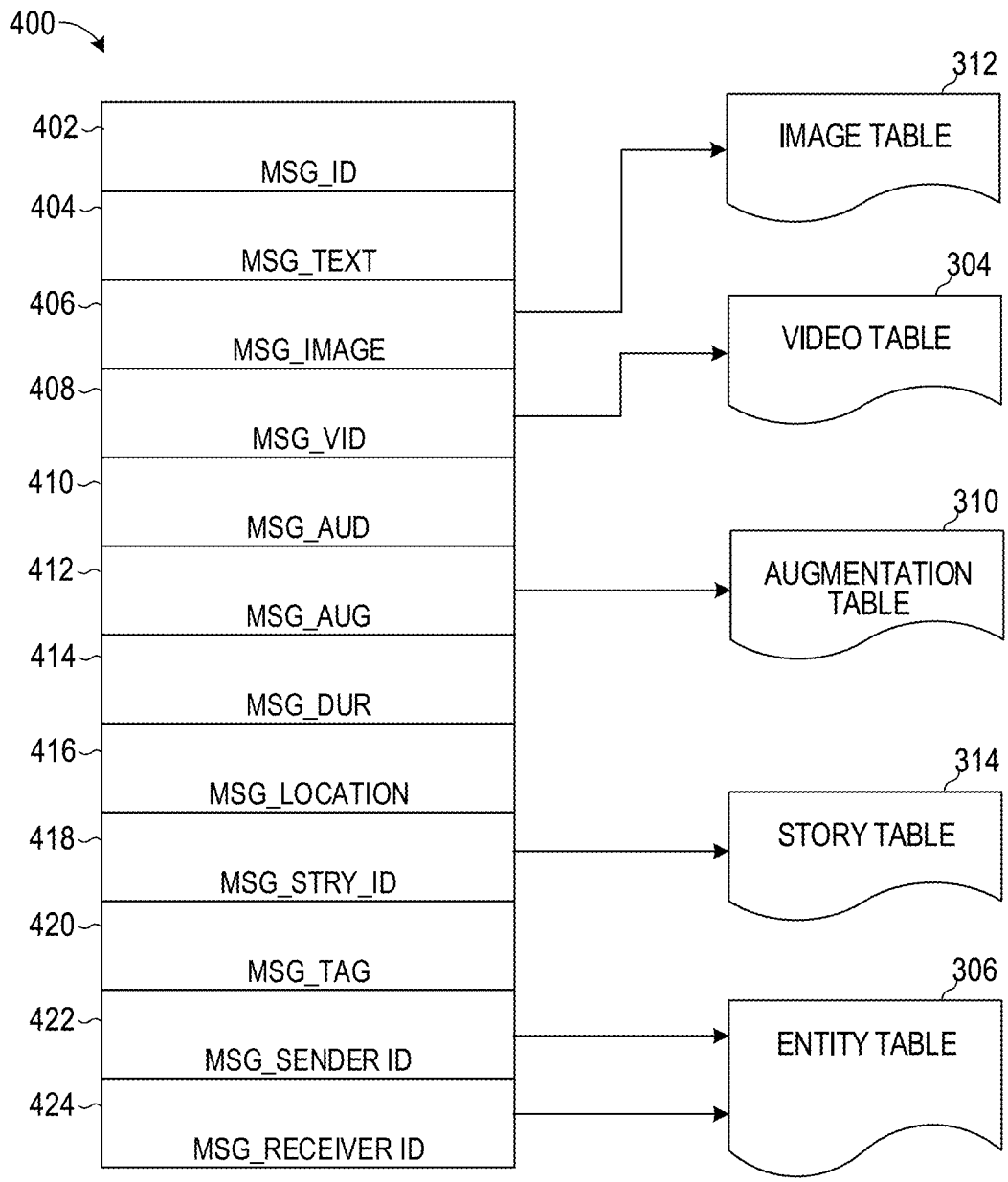
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.
  message text payload 404: text, to be generated by a user via a user interface of the client device 102, and that is included in the message 400.
  message image payload 406: image data, captured by a camera component of a client device 102 or retrieved from a memory component of a client device 102, and that is included in the message 400. Image data for a sent or received message 400 may be stored in the image table 312.
  message video payload 408: video data, captured by a camera component or retrieved from a memory component of the client device 102, and that is included in the message 400. Video data for a sent or received message 400 may be stored in the video table 304.
  message audio payload 410: audio data, captured by a microphone or retrieved from a memory component of the client device 102, and that is included in the message 400.
  message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
  message duration parameter 414: parameter value indicating, in seconds, the amount of time for which content of the message (e.g., the message image payload 406, message video payload 408, message audio payload 410) is to be presented or made accessible to a user via the messaging client 104.
  message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
  message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
  message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
  message sender identifier 422: an identifier (e.g., a messaging system identifier, email address, or device identifier) indicative of a user of the client device 102 on which the message 400 was generated and from which the message 400 was sent.
  message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
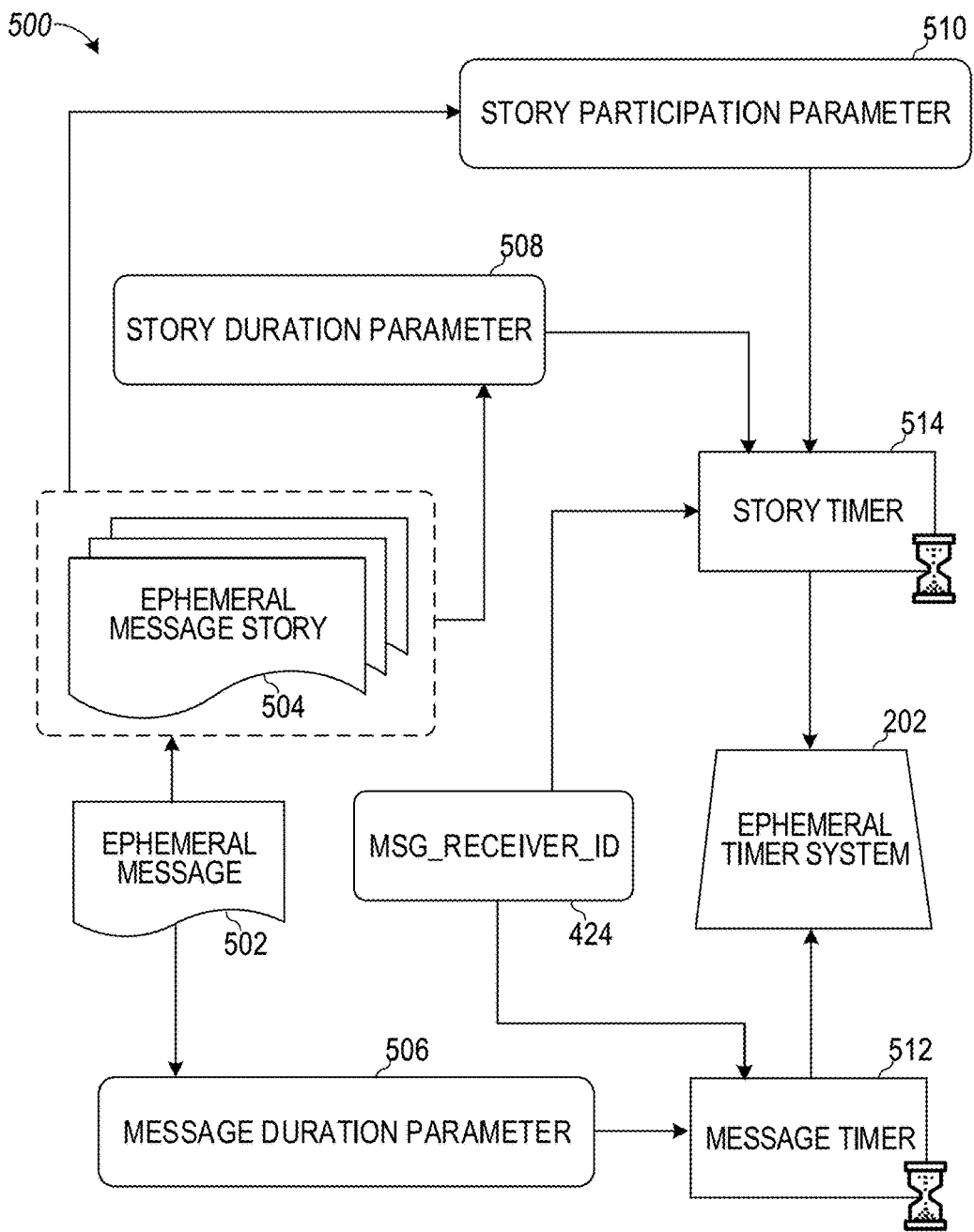
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one embodiment, where the messaging client 104 is a application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provides input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Augmentation System

Figure 6:
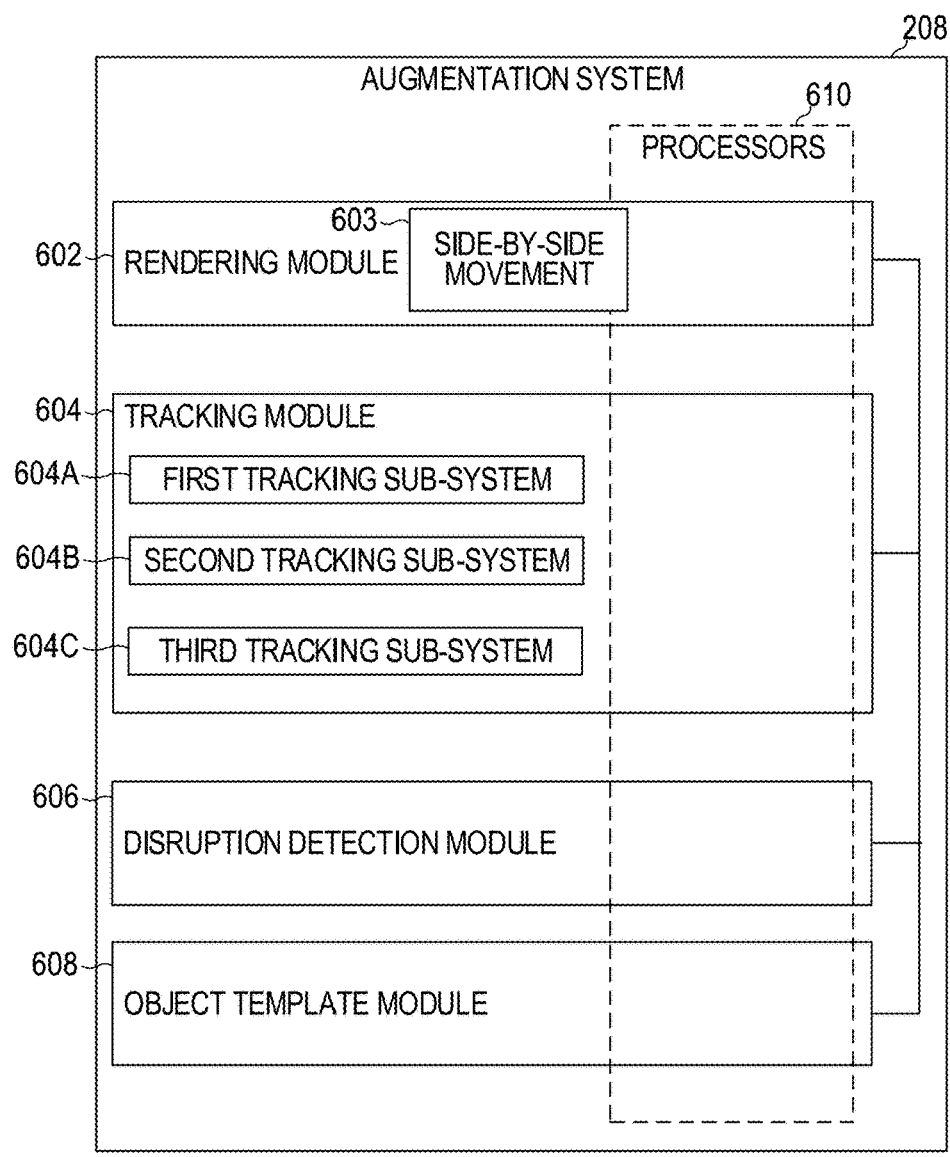
FIG. 6 is a block diagram illustrating various components of an augmentation system, according to example embodiments.

FIG. 6 is a block diagram illustrating functional components of the augmentation system 208 that are configured to render virtual modifications to a three-dimensional space depicted in a video. For example, augmentation system 208 renders virtual within the three-dimensional space relative to a reference point that is associated with a real-world object depicted in the video (e.g., a person). As shown in FIG. 6, augmentation system 208 includes a rendering module 602, a tracking module 604, a disruption detection module 606, an object template module 608, and processors 610.

In some example embodiments, the tracking module 604 comprises a first tracking sub-system 604A, a second tracking sub-system 604B, and a third tracking sub-system 604C, wherein each tracking sub-system tracks the position of the virtual object within the three-dimensional space of a real-world object in a video based on a set of tracking indicia associated with the video. The tracking indicia is obtained and stored from/on client device 102 while the camera of the client device 102 captures the video. The various components of the augmentation system 208 are configured to communicate with each other (e.g., via a bus, shared memory, or a switch). Although not illustrated in FIG. 6, in some embodiments, the augmentation system 208 may include or may be in communication with a camera configured to produce a live camera feed comprising image data that includes a sequence of images or frames (e.g., a video).

Any one or more of the components described may be implemented using hardware alone (e.g., one or more of the processors 610 of a machine) or a combination of hardware and software. For example, any component described of the augmentation system 208 may physically include an arrangement of one or more of the processors 610 (e.g., a subset of or among the one or more processors of the machine) configured to perform the operations described herein for that component. As another example, any component of the augmentation system 208 may include software, hardware, or both, that configure an arrangement of one or more processors 610 (e.g., among the one or more processors of the machine) to perform the operations described herein for that component. Accordingly, different components of the augmentation system 208 may include and configure different arrangements of such processors 610 or a single arrangement of such processors 610 at different points in time.

Moreover, any two or more components of the augmentation system 208 may be combined into a single component, and the functions described herein for a single component may be subdivided among multiple components. Furthermore, according to various example embodiments, components described herein as being implemented within a single machine, database, or device may be distributed across multiple machines, databases, or devices.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a three-dimensional space. For example, the virtual objects may disappear or otherwise behave erratically, thereby interrupting the illusion of the virtual object being presented within the three-dimensional space of a video. This undermines the perceived quality of the three-dimensional experience as a whole.

Traditional tracking systems rely on delivery of sensor information received in real-time from a device in a single approach (Natural Feature Tracking (NFT), Simultaneous Localization And Mapping (SLAM), Gyroscopic, etc.) to track an object in video as the video is being captured to enable a user to add virtual objects to a live scene. These systems leverage camera and motion sensor input data on-the-fly in augmented reality and allow the user to interact with virtual objects in the live moment as the video is being captured. These approaches though do not take into account the position and movement of another object, such as real-world object depicted in the video. Namely, these typical approaches place the virtual objects at designated locations and move the objects relative to a real-world coordinate system. Such objects are moved within the video as the camera or client device 102 that is capturing the video moves around. If a given real-world object moves in the video, the traditional tracking systems do not change the positioning of the virtual objects. This breaks the illusion of reality that is a goal of these systems. Rather than tracking the positioning and placing the virtual objects relative to the position of the client device 102 or the camera, the disclosed embodiments adjust positioning and movement of the virtual objects relative to a real-world object reference position (e.g., the positioning and movement of a person depicted in the image).

The augmentation system 208 stores tracking indicia or a reference point associated with a given object (e.g., a person or other reference object that is selected and that appears in the real-world video). This provides a solution to this problem that enables the user to add a virtual object to a scene in the video and have the virtual object move relative to and based on movement of the real-world object. As one example, the size of the virtual object can increase or decrease based on a change in size of the real-world object. For example, if the real-world object from one frame in the video to another frame in the video comes closer to the client device 102, the virtual object position and movement can similarly be changed. Namely, the virtual object is also moved closer to the client device 102 by the same distance and along the same trajectory as the real-world object. The size of the real-world object may also change as the real-world object approaches or comes closer to the client device 102 or camera. Specifically, the size may increase by a given amount in proportion to the distance the real-world object moves. In such circumstances, the size of the virtual object may also increase by the same given amount from one frame to another.

The augmentation system 208 computes the reference point to be any point that lies within a region corresponding to the real-world object. As an example, the reference point may be any one or combination of more than one skeletal joint position. Once the skeletal joint position or combination of multiple skeletal joint positions are selected, the augmentation system 208 uses their change in position throughout a video to adjust the reference point. As an example, the reference point is computed as a center point between multiple skeletal joint positions of a human body.

In some embodiments, the augmentation system 208 tracks multiple skeletal joints of the real-world object throughout a sequence of multiple frames. The augmentation system 208 identifies a given skeletal joint of the multiple skeletal joints that moves the least amount relative to the other skeletal joints throughout the sequence of frames. The augmentation system 208 selects, as the reference point, the skeletal joint that is determined to have moved the least amount in the sequence of frames as a basis to track and position the virtual object relative to the real-world object. For example, the augmentation system 208 generates a plurality of vectors representing movement of each of a plurality of skeletal joints throughout the sequence of frames. The augmentation system 208 compares the plurality of vectors to identify a given vector that is associated with the least amount of displacement or change along dimension one or all of the three-dimensions. As an example, the arms or elbow joints may move much more and be associated with vectors that indicate a great amount of displacement in 3D whereas the neck joint may move much less than the elbow joints and be associated with a vector that indicates minimal displacement in 3D. In this case, the augmentation system 208 selects the neck joint as the reference point to be used as a basis for tracking a virtual object.

In some embodiments, a user selects a position on the real-world object depicted in the video to be used as the reference point. In some cases, where multiple virtual objects are added to the video, multiple different reference points of the real-world object are used to track each of the virtual objects. For example, a first virtual object may be tracked and repositioned based on movement of the neck joint and a second virtual object may be tracked and repositioned based on movement of the torso or the knee joints. In this way, the different virtual objects move in different ways relative to how the real-world object moves or based on how different portions of the real-world object move.

In some embodiments, the augmentation system 208 is trained using a machine learning technique to predict or estimate a position on the real-world object that is associated with the least movement or noise. The augmentation system 208 processes multiple training images that depict the same type of real-world object. Once the augmentation system 208 recognizes that the real-world object received in a new video matches one of the training real-world objects, the augmentation system 208 retrieves the reference point position along the training real-world objects and places the reference point on the new real-world object to be used as a basis for tracking the virtual object.

In some examples, if the real-world object moves to the right relative to the camera or client device 102 in 3D space by a specified amount, the augmentation system 208 updates the position of the virtual object to also move to the right in the video by the same specified amount. Similarly, if the real-world object moves to the left relative to the camera or client device 102 in 3D space by a specified amount, the augmentation system 208 updates the position of the virtual object to also move to the left in the video by the same specified amount.

The augmentation system 208 computes an offset between a real-world reference point corresponding to the real-world object and an initial position of the virtual object. As the real-world object moves in a given direction and along a given trajectory, the augmentation system 208 adjusts or moves the virtual object along the same direction and trajectory in a way that maintains the same offset relative to the real-world reference point corresponding to the real-world object. In some cases, the virtual object mimics movement of the real-world object. For example, if the real-world object turns around about its own axis, the virtual object also responds by turning around about its own axis at a same rate as the real-world object.

The augmentation system 208, comprising multiple redundant tracking sub-systems 604A-C that enable seamless transitions between such tracking sub-systems, obtains sensor information from multiple tracking approaches stored while a video is captured and merges such multiple tracking approach sensor information into a single tracking system. This system is able to combine tracking virtual objects with 6DoF and 3DoF (degree of freedom) through combining and transitioning between stored sensor information from multiple tracking systems based on the availability of tracking indicia tracked by the tracking systems. As the indicia tracked by any one tracking sub-system becomes unavailable during capture of the video, the augmentation system 208 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6DoF and 3DoF based on the availability of tracking indicia.

In some example embodiments, to transition between tracking in 6DoF and 3DoF, the augmentation system 208 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continues to be provided by the gyroscope. In this way, when the mobile device loses tracking indicia, the tracked objects that are presented in the three-dimensional space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

Figure 7:
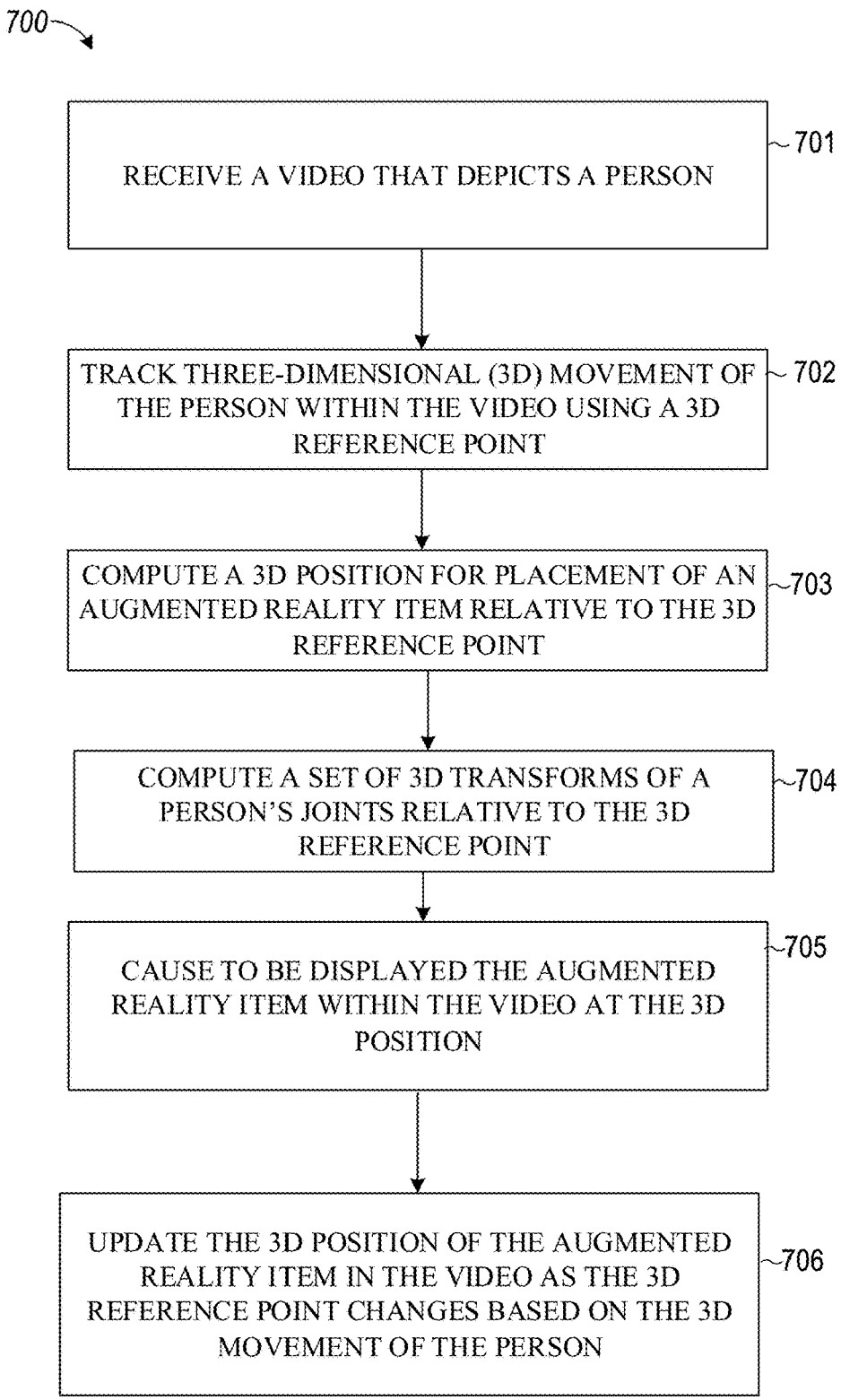
FIGS. 7 and 8 are flowcharts illustrating example operations of the augmentation system in performing a process for rendering a virtual object based on side-by-side movement, according to example embodiments.

FIG. 7 is a flowchart illustrating example operations of the augmentation system 208 in performing a process 700 for rendering a virtual object in a video. The process 700 may be embodied in computer-readable instructions for execution by one or more processors such that the operations of the process 700 may be performed in part or in whole by the functional components of the augmentation system 208; accordingly, the process 700 is described below by way of example with reference thereto. However, in other embodiments at least some of the operations of the process 700 may be deployed on various other hardware configurations. The process 700 is therefore not intended to be limited to the augmentation system 208.

At operation 701, the augmentation system 208 receives a video that depicts a person. For example, a client device 102 transmits a video to the augmentation system 208. The augmentation system 208 receives the video from the client device 102.

At operation 702, the augmentation system 208 tracks three-dimensional (3D) movement of the person within the video using a 3D reference point, as explained above. For example, the augmentation system 208 selects a 3D reference point on the skeletal joint or joints of the person depicted in the video and tracks movement of the selected 3D reference point.

At operation 703, the augmentation system 208 computes a 3D position for placement of an augmented reality item relative to the 3D reference point. For example, the augmentation system 208 computes an offset relative to the 3D reference point (e.g., a point in 3D that is within a threshold distance from the 3D reference point).

At operation 704, the augmentation system 208 compute a set of 3D transforms of a person's joints relative to the 3D reference point. For example, the augmentation system 208 maps each 3D skeleton joint to a corresponding 3D skeleton rig portion (joint) of an avatar. The 3D transform indicates how the corresponding 3D skeleton rig joint of the avatar moves to reflect movement or pose of the associated person's joint in 3D.

At operation 705, the augmentation system 208 causes to be displayed the augmented reality item within the video at the 3D position. For example, the augmentation system 208 presents an avatar at the 3D position, such as in front of or next to the person depicted in the video.

At operation 706, the augmentation system 208 updates the 3D position of the augmented reality item in the video as the 3D reference point changes based on the 3D movement of the person. For example, the augmentation system 208 moves the avatar closer in view in the video as the person in the video moves closer to the client device 102 used to capture the video. As another example, the augmentation system 208 moves the avatar farther away in the video by the same amount and distance as the person in the video moves farther away from the client device 102 used to capture the video.

Referring back to FIG. 6, the augmentation system 208 is configured to render and display virtual objects at a position in a three-dimensional space relative to a real-world object. In one example, the augmentation system 208 maintains a set of templates to generate virtual objects to be displayed in the video. Upon receiving a selection of a template from among the set of templates, and a selection of a position in the video, the augmentation system 208 generates and assigns the virtual object to the position within the three-dimensional space of the video.

The augmentation system 208 thereby tracks the position of the virtual object relative to real-world objects in the video in the three-dimensional space by one or more tracking systems in 6DoF. For example, the one or more tracking systems of the augmentation system 208 collects and analyzes a set of tracking indicia (e.g., roll, pitch, yaw, natural features, etc.) in order to track the position of the virtual object relative to real-world objects in the three-dimensional space with 6DoF. In such embodiments, the augmentation system 208 transitions between tracking systems based on the availability of the tracked indicia to maintain consistent tracking in 6DoF.

In some embodiments, the augmentation system 208 automatically tracks and adjusts movement and positioning of the virtual object relative to a real-world object that is a person. Namely, the augmentation system 208 processes the video to determine whether a person is present in the video. In response to detecting presence of a person in the video, the augmentation system 208 automatically performs 3D skeleton tracking to determine various joint positions and a 3D real-world coordinate of the person as a reference point. The augmentation system 208 then automatically starts adjusting movement and placement of the virtual object based on the reference point of the person. As an example, the augmentation system 208 computes a set of 3D transforms of the 3D skeleton joints relative to the 3D reference point. The 3D transforms are used to adjust the virtual object (character) in the same way as the 3D skeleton joints move in real time. In some cases, each 3D skeleton joint is mapped to a corresponding 3D skeleton rig portion (joint) of an avatar. The 3D transform indicates how the corresponding 3D skeleton rig joint of the avatar should move to reflect movement of the associated person's joint in 3D. In some cases, the augmentation system 208 calculates the 3D pose of the person in the video and applies the 3D pose to one or more virtual objects so that the virtual objects mirror a pose and movement of the person in 3D. As an example, motion of the person detected in the video is captured and tracked in real time and that same motion is applied to one or more virtual objects so that the one or more virtual objects move in 3D in a same or similar manner as the person.

In some embodiments, the augmentation system 208 fails to detect a person in the video. In such cases, the augmentation system 208 presents a list of detected objects that are present in the video to a user on the client device 102. The augmentation system 208 receives a user selection of a given detected object (e.g., a cat) and in response, the augmentation system 208 computes a reference position in 3D space of the selected detected object and adjusts the positioning and movement of the virtual object relative to the reference position. In this way, as the reference position indicates that the object (e.g., the person or the selected real-world object) moves in a particular direction and at a particular speed, the augmentation system 208 immediately and automatically updates the position and movement of the virtual object in the same direction and speed. In one example, the real-world object may jump displacing the 3D reference position by a specified distance along the y-axis. In response, the augmentation system 208 updates the virtual object position to also jump and to be displayed by the same specified distance along the y-axis as the real-world object.

Upon detecting an interruption of one or more indicia from among the set of indicia tracked, such that tracking in 6DoF becomes unreliable or impossible, the augmentation system 208 transitions to tracking the virtual object in the three-dimensional space in 3DoF in order to prevent an interruption of the display. For example, the augmentation system 208 transitions from a first tracking system (or first set of tracking systems among the set of tracking systems) to a second tracking system among the set of tracking systems (or second set of tracking systems). In one example, the second tracking system is capable of tracking the virtual object with 3DoF in the three-dimensional space, based on the tracking indicia available.

In some example embodiments, the set of tracking systems of the augmentation system 208 includes a gyroscopic tracking system, an NFT system, and well as a SLAM tracking system. Each tracking system among the set of tracking systems may analyze tracking indicia in order to track a position of a virtual object within a three-dimensional space relative to a real-world object reference position. For example, to track a virtual object with 6DoF, the augmentation system 208 may require at least six tracking indicia to be available. As tracking indicia become obstructed or unavailable for various reasons, the augmentation system 208 may transition between the available tracking systems among the set of tracking systems in order to maintain 6DoF, or transition to 3DoF if necessary.

It will be readily appreciated that these augmented reality systems 124 serve to provide consistent rendered virtual objects in real-world three-dimensional spaces in a wide variety of environments and situations. In many applications it can be desirable to provide firm consistency for the positions of these virtual objects within a video of a real-world scene. This can involve the recognition and use of a specific, fixed reference point (e.g., a fixed surface or object) in the real-world scene.

To ensure firm consistency in the location of virtual objects, annotation data in the example form of a presentation "lens" that is specific for the three-dimensional object tracking and rendering in a video clip described herein may be employed. In particular, a side-by-side movement 603 is a presentation lens that identifies and references a real-world object (e.g., a person) for the consistent rendering and presentation of virtual objects in the video. Side-by-side movement 603 may be a presentation lens that is activated when a user is previewing a given video clip and activates a virtual object insertion feature by pressing a suitable button or swiping in a given direction across the screen or providing any other suitable input (verbal or gesture). As shown, the side-by-side movement 603 can be a specific portion or submodule within a rendering module 602 of an overall augmentation system 208, as set forth above.

The 3DoF pose along with the video clip frame is provided to a surface tracking component of the augmentation system 208 where features or key points of interest in the video frame are extracted and tracked to determine the way they move across video frames fusing the orientation information from the 3DoF pose to generate a resulting 6DoF pose. Exemplary details of how this fusion can be performed is described in Benezra et al. U.S. Pub. 2018/0061072, entitled "Systems and methods for simultaneous localization and mapping," which is incorporated herein by reference in its entirety.

The 6DoF pose from the surface tracking component is then provided to rendering module 602 in order to position the camera such that the virtual objects are rendered as if they were placed in the real-world during the original video capture. Rendering module 602 synchronizes changes in the placement and post of the virtual object with changes in the camera position and orientation in the captured scene.

The use of such a side-by-side movement 603 as part of an overall virtual rendering can result in presentations that are more dynamically convincing even as one or more object positions or the camera angle change throughout the video.

In some embodiments, the augmentation system 208 processes the frames of the video clip to identify a set of real-world objects. The augmentation system 208 generates an interactive augmented reality display that adds a virtual object to the stored video content to create augmented video content comprising the real-world scene and the virtual object. The graphical user interface may enable a user to drag and drop a virtual object onto a frame in the video to cause the virtual object to track the position in 3D space of a given one of the real-world objects.

In one aspect, the augmentation system 208 provides a graphical user interface for receiving user input to add virtual objects to augment a video. The graphical user interface may include a toolbar or pane (which may be partially transparent or may be opaque). The toolbar or pane may present, in the graphical user interface, a plurality of virtual objects by way of icons for each virtual object. The user can interact with the toolbar or pane to select a given virtual object for placement in the video. Once placed in the video, the graphical user interface allows the user to move the virtual object around a given frame. Once the virtual object is placed at a selected position, a 3D offset is computed relative to a 3D reference position of a given real-world object (e.g., a person). This 3D offset continues to be tracked and computed in order to continuously adjust a 3D position of the virtual object based on movement of the real-world object.

After the virtual object is added to a video, the virtual object can be modified or manipulated in various ways in 3DoF or 6DoF. Examples of how virtual objects can be manipulated are discussed in commonly-owned, commonly-assigned U.S. patent application Ser. No. 15/581,994, filed Apr. 28, 2017, entitled "AUGMENTED REALITY OBJECT MANIPULATION", which is hereby incorporated by reference in its entirety.

In some embodiments, the side-by-side movement 603 component of the augmentation system 208 allows a user to select a multiple augmented reality item option. In response, the side-by-side movement 603 duplicates the virtual object that is added a specified number of times. For example, if the user selects a duplication factor of 2, then the side-by-side movement 603 places two identical augmented reality items or virtual objects into the video. In some cases, the side-by-side movement 603 places the virtual objects on opposite sides of the real-world object and at the same respective distances from the reference point corresponding to the real-world object. The virtual objects mimic each other's movements and the movements of the real-world object. Namely, if the real-world object moves closer to the client device 102 by a specified distance, the two virtual objects are similarly moved by the same distance closer to the client device 102. The position of each virtual object is independently determined with respect to the same reference point of the real-world object.

In some cases, the user can select a random number of identical augmented reality items to be added. In such cases, the side-by-side movement 603 evenly distributes the augmented reality items (e.g., 4 duplications of the augmented reality items) around or surrounding the real-world object. Once a specified number of virtual objects or augmented reality items surround the real-world object (e.g., after 4 duplications of the virtual objects surround the real-world object), the side-by-side movement 603 may place additional virtual objects (e.g., a fifth duplication) in front of a given one of the virtual objects. This process continues until all of the duplications are added to the video. Then the side-by-side movement 603 tracks and updates movement of each duplication of the virtual objects in an identical manner to mimic movement of the real-world object that is depicted in the video.

The maximum number of identical virtual objects that can be added to the video can be set based on the type of virtual objects that are added. For example, virtual objects that are of a certain first type (e.g., animals or objects that have a certain first size) may be duplicated a first number of times (e.g., 8 times). Virtual objects that are of a certain second type (e.g., avatars representing a user or objects that have a certain second size, larger than the first size) may be duplicated a second number of times (e.g., 4 times).

Figure 8:
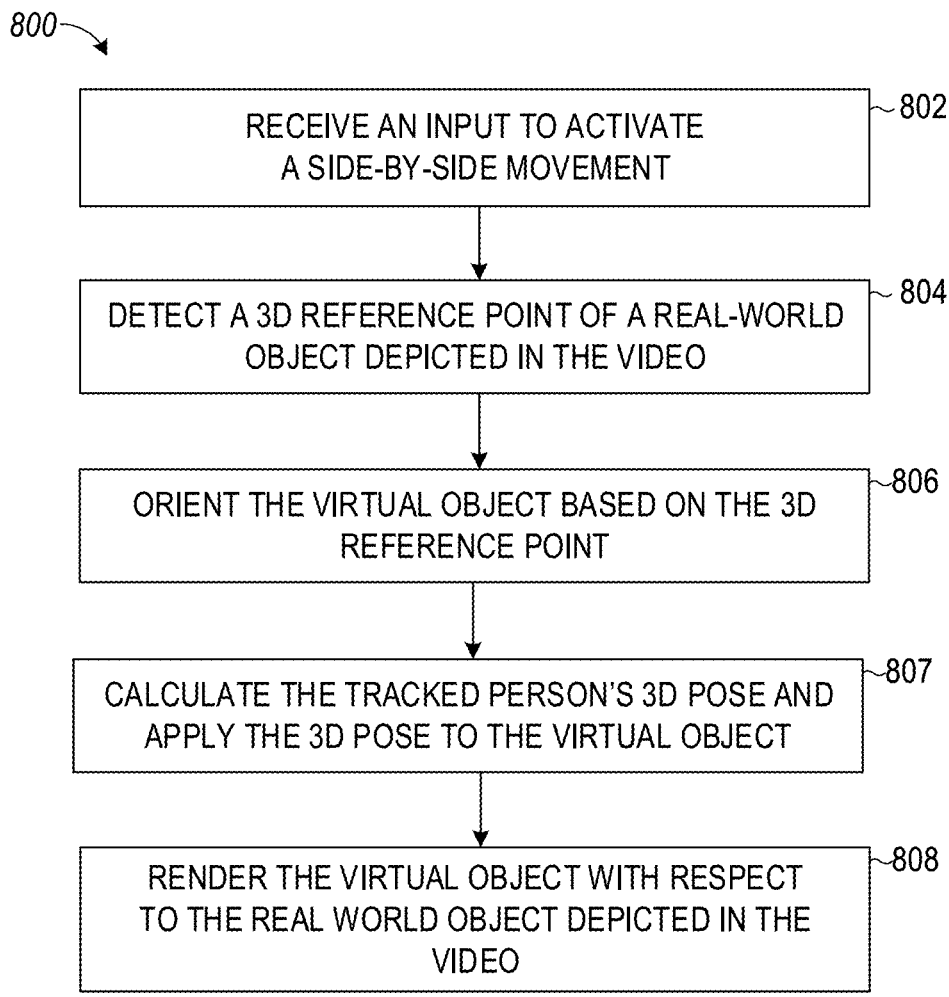

FIG. 8 is a flowchart illustrating operations of the augmentation system 208 in performing a process 800 for rendering a virtual object in a video, according to certain example embodiments. The process 800 may be embodied in computer-readable instructions for execution by one or more processors such that the operations of the process 800 may be performed in part or in whole by the functional components of the augmentation system 208; accordingly, the process 800 is described below by way of example with reference thereto. However, it shall be appreciated that at least some of the operations of the process 800 may be deployed on various other hardware configurations, and the process 800 is not intended to be limited to the augmentation system 208.

At operation 802, the augmentation system 208 receives an input to activate a side-by-side movement. For example, the user can select an on-screen option to tie movement or placement of a given virtual object to the movement and placement of a real-world object (e.g., a person).

At operation 804, the augmentation system 208 detects a 3D reference point of a real-world object depicted in the video.

At operation 806, the augmentation system 208 orients the virtual object based on the 3D reference point. For example, the augmentation system 208 places the virtual object at a specified distance away from the 3D reference point.

At operation 807, the augmentation system 208 calculate the tracked person's 3D pose and apply it to a virtual object (e.g., a virtual character). For example, the augmentation system 208 computes a 3D transform and tracks movement of the person in 3D to detect a 3D pose or changes to a 3D pose. The augmentation system 208 then modifies one or more virtual objects to mirror the 3D pose of the person.

At operation 808, the augmentation system 208 renders the virtual object with respect to the real-world object depicted in the video. For example, as the real-world object moves around in 3D space, the virtual object similarly follows and mimics the movement of the real-world object.

Figure 9:
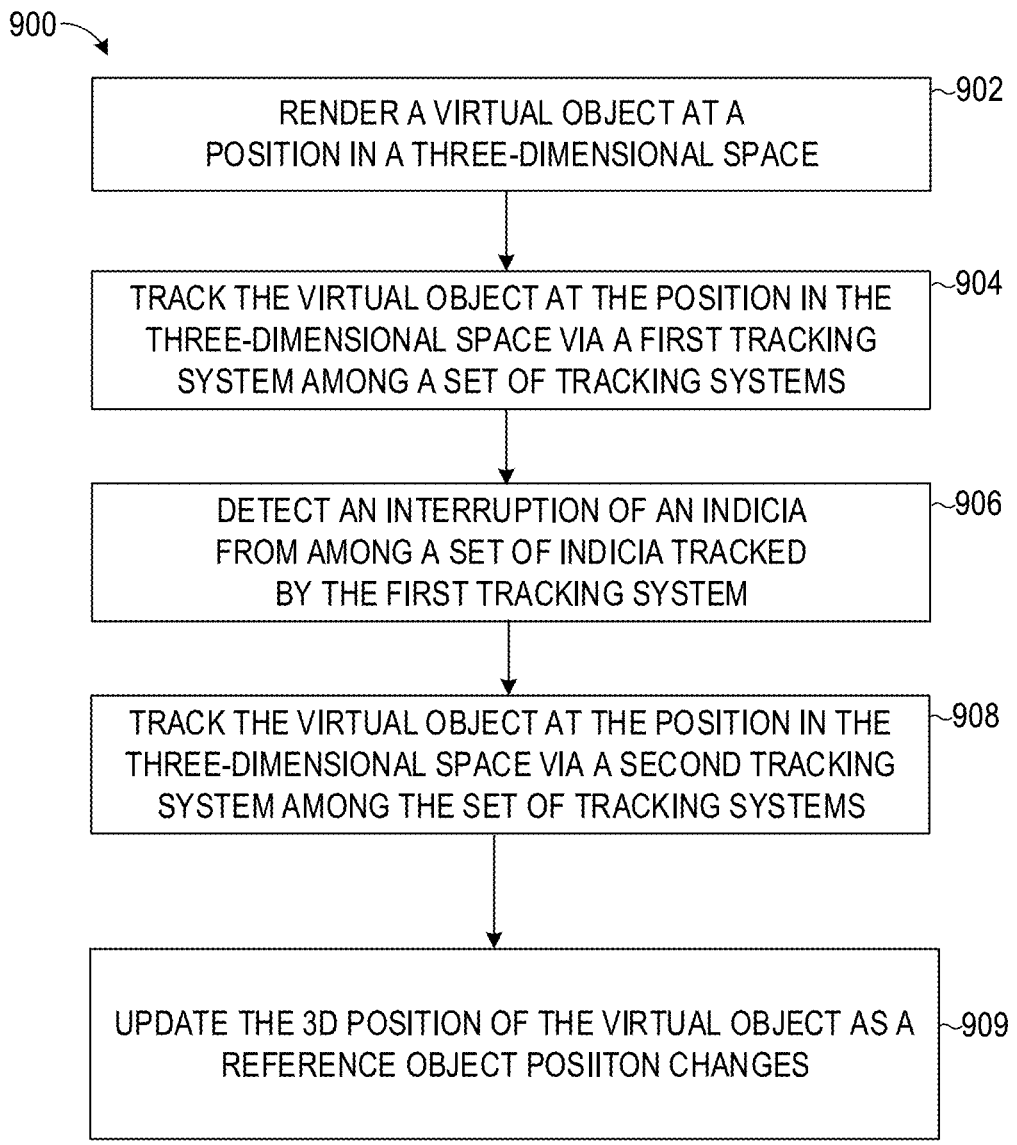
FIG. 9 is a flowchart illustrating example operations of the augmentation system (augmented reality system) in performing a process for tracking an object rendered in a video, according to example embodiments.

FIG. 9 is a flowchart illustrating operations of the augmentation system 208 in performing a process 900 for tracking an object at a position relative to a target real-world object in a video, according to certain example embodiments. The process 900 may be embodied in computer-readable instructions for execution by one or more processors such that the operations of the process 900 may be performed in part or in whole by the functional components of the augmentation system 208; accordingly, the process 900 is described below by way of example with reference thereto. However, it shall be appreciated that at least some of the operations of the process 900 may be deployed on various other hardware configurations and the process 900 is not intended to be limited to the augmentation system 208.

At operation 902, the rendering module 602 renders a virtual object at a position relative to a target real-world object in a three-dimensional space. The virtual object may include interactive content generated by the user based on user-provided parameters.

At operation 904, the tracking module 604 tracks the virtual object in 6DoF at the position in the three-dimensional space of the target real-world object via the first tracking sub-system 604A, or a combination of multiple tracking sub-systems (e.g., the first tracking sub-system 604A and the second tracking sub-system 604B), based on a set of tracking indicia stored for the video clip obtained while the video was being captured. When tracking the virtual object in 6DoF, a user viewing the object on the client device 102 can turn or move in any direction without disrupting the tracking of the object. For example, the tracking module 604 may track the position of the virtual object based on a combination of an NFT system and a gyroscopic tracking system.

At operation 906, the disruption detection module 606 detects an interruption of a tracking indicia from among the tracking indicia tracked by the tracking sub-systems (e.g., the first tracking sub-system 604A). For example, the first tracking sub-system 604A may include a NFT system configured to rely on tracking indicia that include features of an environment or active light sources in proximity to annotated virtual objects within the environment (e.g., the ground's plane, or the horizon). The NFT system of the first tracking sub-system 604A may therefore rely on the positions of three or more known features in the environment to determine the position of the virtual object relative to the target real-world object in the three-dimensional space. Should any one or more of the tracking indicia tracked by the first tracking sub-system 604A become obstructed or unavailable, the tracking of the virtual object in the three-dimensional space would become disrupted.

At operation 908, in response to the disruption detection module 606 detecting a disruption of one or more tracking indicia, the tracking module 604 transitions to one or more other tracking sub-systems (e.g., the second tracking sub-system 604B and/or the third tracking sub-system 604C) to maintain tracking of the virtual object relative to the target real-world object in the three-dimensional space. In particular, tracking module 604 obtains, from storage, sensor information of a different type associated with the video clip. In doing so, the augmentation system 208 may transition from 6DoF to 3DoF, wherein 3DoF measures pitch, roll, and yaw, but does not measure translations. As the tracking indicia again become available, the augmentation system 208 may thereby transition from 3DoF back to 6DoF. For example, when the NFT system becomes unavailable, the tracking module 604 may utilize the last tracking indicia gathered and tracked by the NFT system throughout the subsequent 3DoF experience.

At operation 909, the augmentation system 208 updates the 3D position of the augmented reality item in the video as the 3D reference point changes based on the 3D movement of the object.

Figure 10:
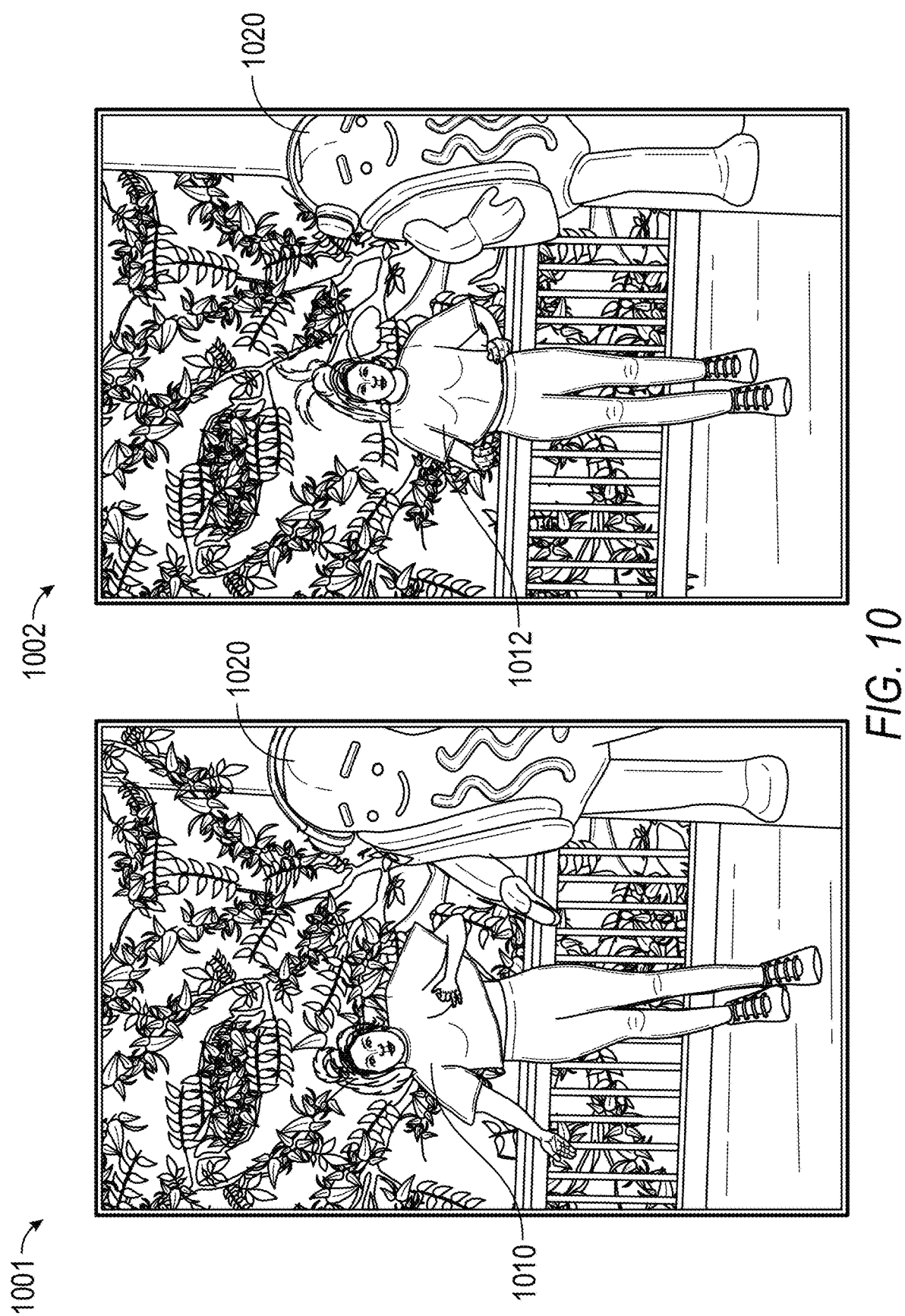
FIGS. 10 and 11 are diagrams depicting an object rendered within a three-dimensional space by the augmentation system, according to example embodiments.
Figure 11:
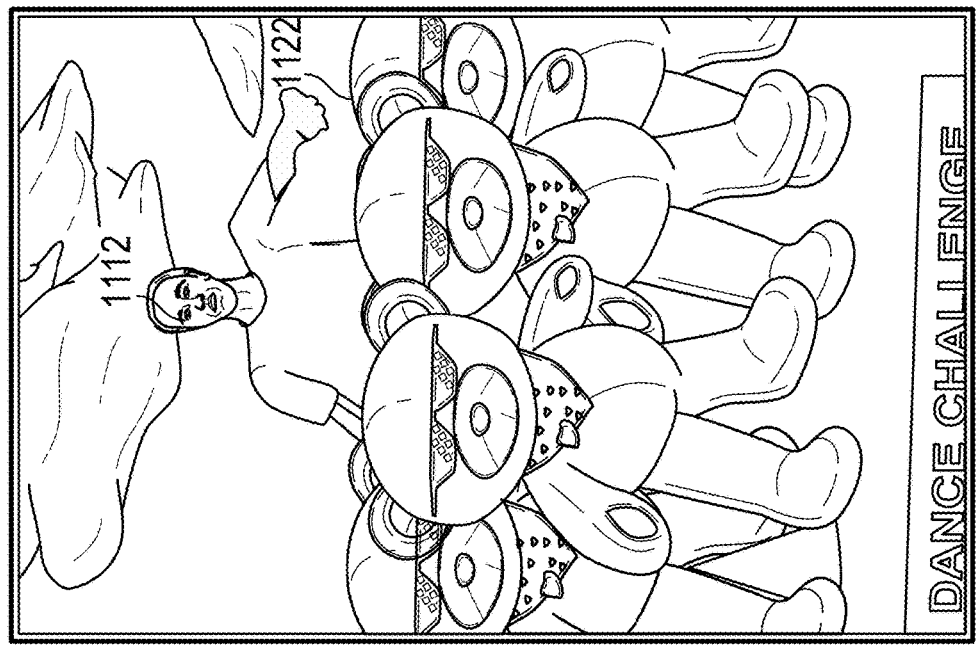
Figure 11:
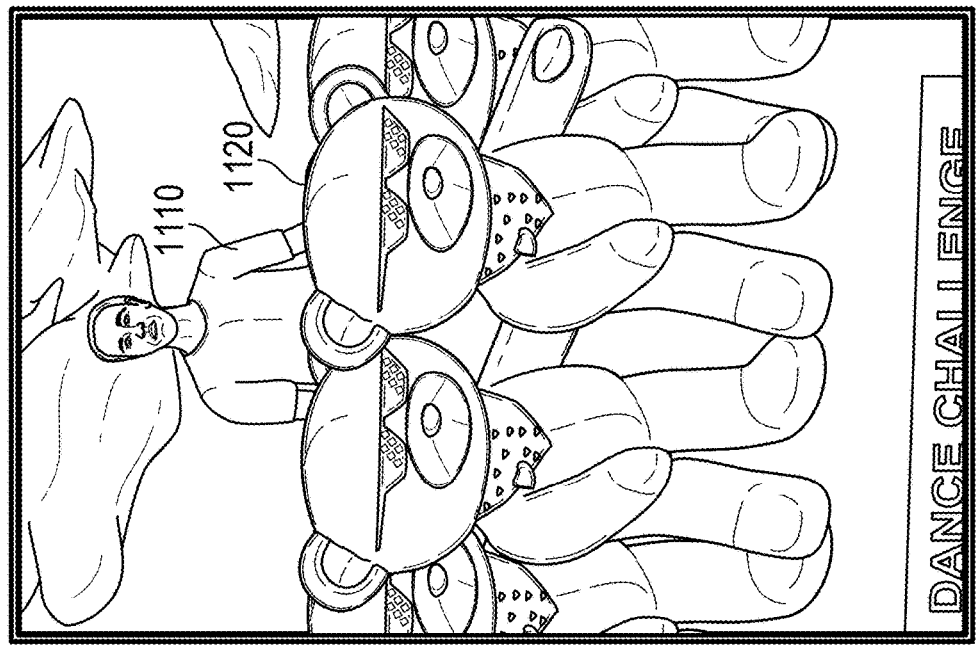

FIGS. 10 and 11 are diagrams depicting an object rendered within a three-dimensional space by the augmentation system 208, according to example embodiments.

As shown in FIG. 10, the graphical user interface 1001 shows a real-world object 1010 at a particular position within a video. The augmentation system 208 determines the reference point corresponding to the real-world object 1010 and then places a virtual object 1020 (e.g., a virtual character) at a position within the video relative to the reference point. The pose of the virtual object 1020 mirrors the pose of the real-world object 1010 (e.g., the arms and legs of the virtual object 1020 are in a same 3D position relative to the corresponding arms and legs of the real-world person 1010 but are offset based on the reference point. As shown in the graphical user interface 1002, the real-world object 1012 has moved to a new 3D position and is in a new 3D pose. The corresponding virtual object 1022 is updated to reflect the new 3D position and 3D pose relative to the reference point. In some cases, as the real-world object 1010 moves farther away in 3D space from the client device 102 being used to capture the video, the augmentation system 208 updates the position and placement of the virtual object 1020 to similarly be farther away from the client device 102 by the same distance. The size of the real-world object 1010 shrinks or decreases by a specified scale and the augmentation system 208 updates the size of the real-world object to be reduced by the same specified scale based on the movement away from the client device 102.

As shown in FIG. 11, the graphical user interface 1101 shows a real-world object 1110 at a particular position within a video. The augmentation system 208 determines the reference point corresponding to the real-world object 1110 and then places multiple (identical) virtual objects 1120 (e.g., a virtual characters) at respective positions within the video relative to the reference point. The poses of the virtual objects 1120 mirror the pose of the real-world object 1110 (e.g., the arms and legs of the virtual objects 1120 are in a same respective 3D position relative to the corresponding arms and legs of the real-world person 1110 but are each offset based on the same reference point. As shown in the graphical user interface 1102, the real-world object 1112 has moved to a new 3D position and is in a new 3D pose. The corresponding virtual objects 1122 are updated to reflect the new 3D position and 3D pose relative to the reference point.

Software Architecture

Figure 12:
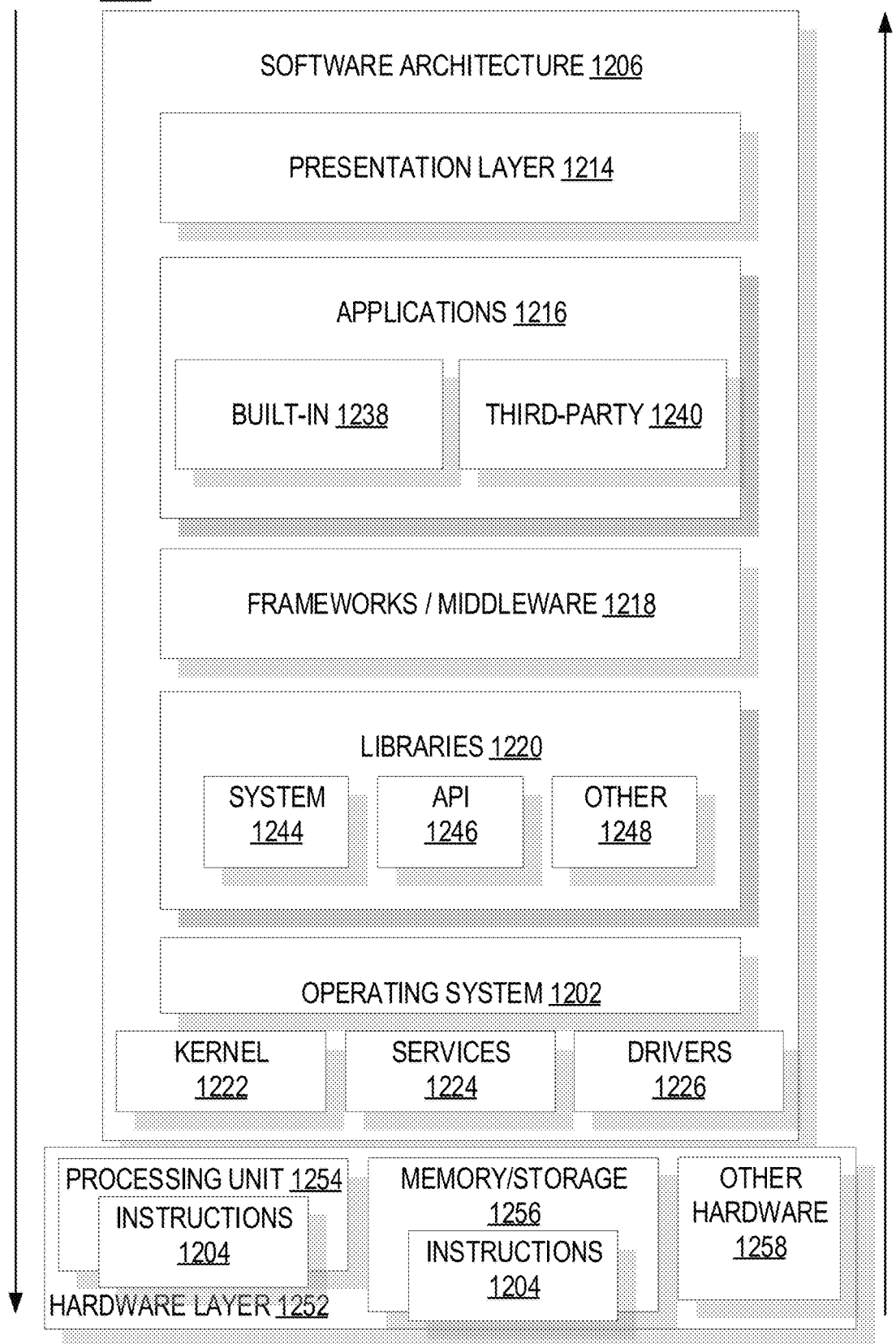
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1300 of FIG. 13 that includes, among other things, processors 1304, memory 1314, and input/output (I/O) components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216, frameworks/middleware 1218, and a presentation layer 1214. Operationally, the applications 1216 and/or other components within the layers may invoke API calls 1208 through the software stack and receive messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Machine

Figure 13:
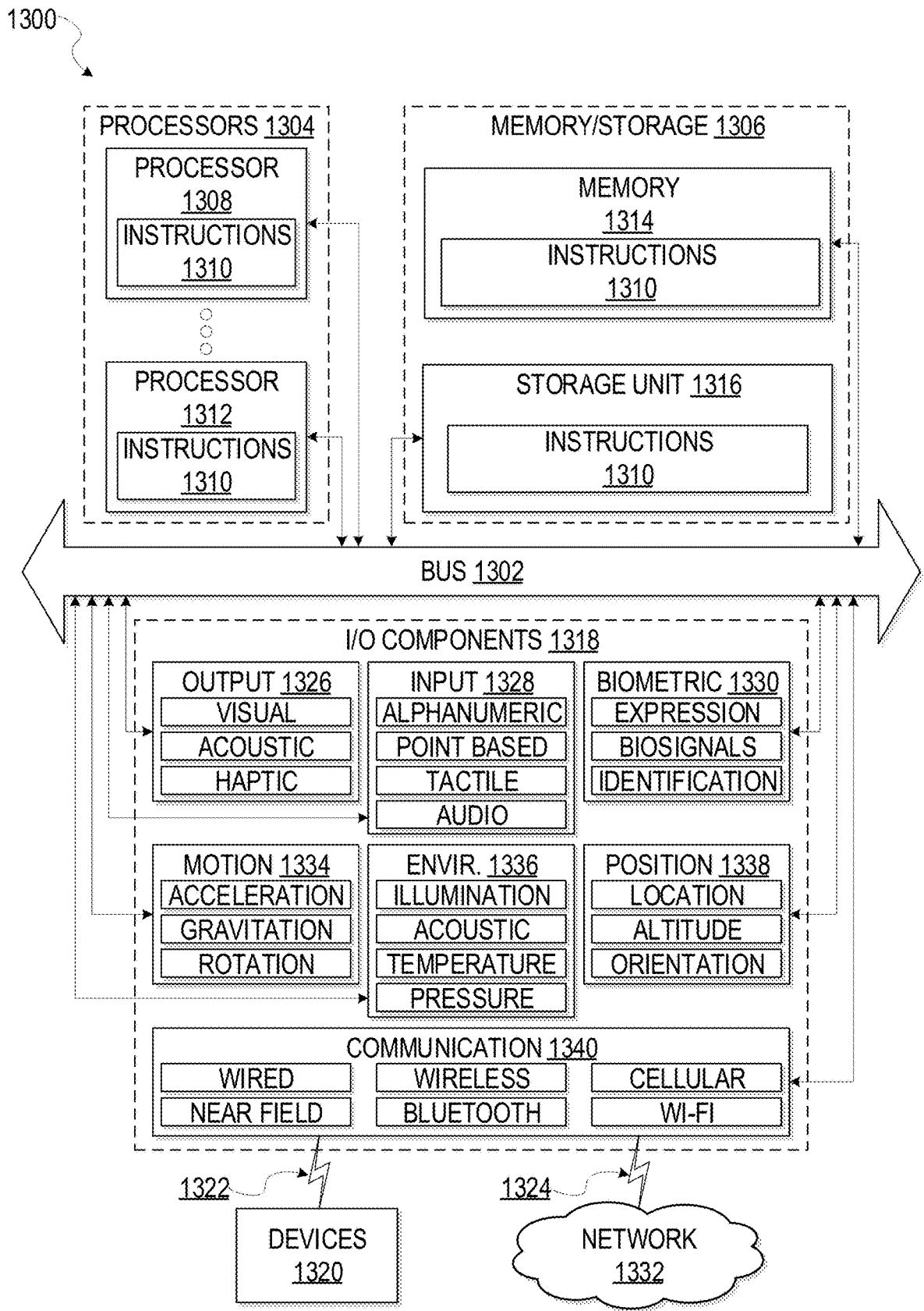
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. In an example embodiment, the processors 1304 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1308 and a processor 1312 that may execute the instructions 1310. The term "processor" is intended to include multi-core processors 1304 that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   receiving, by one or more processors, a video that depicts a person;
   identifying a given skeletal joint of multiple skeletal joints of the person depicted in the video that moves less relative to other skeletal joints of the multiple skeletal joints;
   selecting, as a three-dimensional (3D) reference point, the given skeletal joint that has been identified as moving less relative to the other skeletal joints; and
   tracking 3D movement of the person within the video using the selected 3D reference point.

2. The method of claim 1, further comprising:
   computing a 3D position for placement of a virtual item relative to the 3D reference point;
   causing to be displayed the virtual item within the video at the 3D position; and
   updating the 3D position of the virtual item in the video as the 3D reference point changes based on the 3D movement of the person.

3. The method of claim 1, further comprising:
   determining a size of a body part corresponding to a given skeletal joint of the multiple skeletal joints of the person depicted in the video;
   identifying a portion of a skeletal rig of a virtual item that corresponds to the body part; and
   modifying a size of the portion of the skeletal rig to match the determined size of the body part corresponding to the given skeletal joint of the multiple skeletal joints of the person depicted in the video.

4. The method of claim 1, further comprising:
   determining that the person has moved from a first 3D position to a second 3D position between a first frame and a second frame of the video;
   computing a distance and trajectory of the movement of the person from the first 3D position to the second 3D position; and moving a virtual item from a third 3D position to a fourth 3D position based on the distance and trajectory of the movement of the person from the first 3D position to the second 3D position.

5. The method of claim 4, wherein the video is captured by a client device, wherein the second 3D position is closer to the client device than the first 3D position, and wherein the fourth 3D position appears closer to the client device than the third 3D position.

6. The method of claim 5, further comprising increasing a size of the virtual item proportionally by an amount of increase in size of the person from the first frame to the second frame.

7. The method of claim 4, wherein the video is captured by a client device, wherein the second 3D position is farther from the client device than the first 3D position, and wherein the fourth 3D position appears farther from the client device than the third 3D position.

8. The method of claim 7, further comprising decreasing a size of the virtual item proportionally by an amount of increase in size of the person from the first frame to the second frame.

9. The method of claim 1, further comprising:
determining that the person has moved left or right by a given distance; and
in response to determining that the person has moved left or right by the given distance, moving a virtual item left or right by the given distance.

10. The method of claim 1, further comprising:
determining that the person has turned around within the video at a given rate; and
in response to determining that the person has turned around within the video at the given rate, turning a virtual item around at the given rate.

11. The method of claim 1, wherein the person is depicted in a first frame of the video, further comprising:
determining that a depiction of the person has failed to be detected in a second frame of the video;
in response to determining that the depiction of the person has failed to be detected in the second frame of the video, presenting a list of objects detected in the second frame;
receiving input that selects a given object from the list of objects;
computing a reference position of the given object; and
updating a 3D position of a virtual item based on the computed reference position of the given object selected by the received input from the list of objects.

12. The method of claim 1, comprising:
displaying a first virtual item; and
causing to be displayed a second virtual item that mimics movement and placement of the first virtual item.

13. The method of claim 12, wherein the second virtual item is placed at a specified position relative to the person and the first virtual item, further comprising receiving input that selects the 3D reference point of the person depicted in the video.

14. The method of claim 1, further comprising:
determining a size of the person depicted in the video; and
adjusting a size of a virtual item based on the size of the person.

15. The method of claim 1, wherein the 3D reference point is a first 3D reference point and the given skeletal joint is a first skeletal joint, and wherein a virtual item is a first virtual item, further comprising:
selecting a second 3D reference point corresponding to a second skeletal joint of the multiple skeletal joints of the person depicted in the video; and
updating a position of a second virtual item based on changes to the second 3D reference point independently of updating the 3D position of the first virtual item based on changes to the first 3D reference point.

16. The method of claim 1, comprising:
duplicating a virtual item to generate a plurality of identical virtual items based on a user selected duplication factor;
causing the plurality of identical virtual items to be evenly distributed around the person depicted in the video; and
animating the plurality of identical virtual items based on the 3D movement of the person.

17. The method of claim 16, further comprising:
setting a maximum limit to a number of duplicates of the virtual item based on a type associated with the virtual item, a first type of virtual items being associated with a first maximum duplication quantity and a second type of virtual items being associated with a second maximum duplication quantity.

18. A system comprising:
one or more processors configured to perform operations comprising:
receiving a video that depicts a person;
identifying a given skeletal joint of multiple skeletal joints of the person depicted in the video that moves less relative to other skeletal joints of the multiple skeletal joints;
selecting, as a three-dimensional (3D) reference point, the given skeletal joint that has been identified as moving less relative to the other skeletal joints; and
tracking 3D movement of the person within the video using the selected 3D reference point.

19. The system of claim 18, the operations comprising:
computing a 3D position for placement of a virtual item relative to the 3D reference point;
causing to be displayed the virtual item within the video at the 3D position; and
updating the 3D position of the virtual item in the video as the 3D reference point changes based on the 3D movement of the person.

20. A non-transitory machine-readable storage medium that includes instructions that, when executed by one or more processors of a machine, cause the machine to perform operations comprising:
receiving a video that depicts a person;
identifying a given skeletal joint of multiple skeletal joints of the person depicted in the video that moves less relative to other skeletal joints of the multiple skeletal joints;
selecting, as a three-dimensional (3D) reference point, the given skeletal joint that has been identified as moving less relative to the other skeletal joints; and
tracking 3D movement of the person within the video using the selected 3D reference point.

* * * * *

UNITED STATES PATENT AND TRADEMARK OFFICE
CERTIFICATE OF CORRECTION

PATENT NO. : 12,243,173 B2  
APPLICATION NO. : 18/100080  
DATED : March 4, 2025  
INVENTOR(S) : Assouline et al.

Page 1 of 1

It is certified that error appears in the above-identified patent and that said Letters Patent is hereby corrected as shown below:

On the Title Page

On page 4, in Column 2, item (56) under "Other Publications", Line 16, delete "Apperance" and insert --Appearance-- therefor On page 4, in Column 2, item (56) under "Other Publications", Line 22, delete "Garmant" and insert --Garment-- therefor On page 6, in Column 2, item (56) under "Other Publications", Line 17, delete "PCT/US2022/052532,23"," and insert --PCT/US2022/052532, Written Opinion mailed Apr. 17, 2023",-- therefor Signed and Sealed this  
Twenty-seventh Day of May, 2025

Coke Morgan Stewart  
*Acting Director of the United States Patent and Trademark Office*